(12) United States Patent
Clark

(10) Patent No.: US 10,556,240 B2
(45) Date of Patent: Feb. 11, 2020

(54) PRODUCT VERIFICATION FOR HARD DRIVE DATA DESTROYING DEVICE

(71) Applicant: Serenity Data Security, LLC, Carbondale, IL (US)

(72) Inventor: Kevin P. Clark, Carbondale, IL (US)

(73) Assignee: Serenity Data Security, LLC, Carbondale, IL (US)

( * ) Notice: Subject to any disclaimer, the term of this patent is extended or adjusted under 35 U.S.C. 154(b) by 313 days.

(21) Appl. No.: 15/516,580

(22) PCT Filed: Jul. 1, 2016

(86) PCT No.: PCT/US2016/040805
§ 371 (c)(1),
(2) Date: Apr. 3, 2017

(87) PCT Pub. No.: WO2017/004573
PCT Pub. Date: Jan. 5, 2017

(65) Prior Publication Data
US 2018/0264559 A1 Sep. 20, 2018

Related U.S. Application Data

(60) Provisional application No. 62/188,039, filed on Jul. 2, 2015.

(51) Int. Cl.
*B02C 25/00* (2006.01)
*B23C 3/04* (2006.01)
(Continued)

(52) U.S. Cl.
CPC ............... *B02C 25/00* (2013.01); *B23C 3/04* (2013.01); *B23K 26/362* (2013.01);
(Continued)

(58) Field of Classification Search
CPC .. B23K 2101/03; B23K 26/362; B23K 26/36; B23K 26/361; B23K 2101/36;
(Continued)

(56) References Cited

U.S. PATENT DOCUMENTS 249,110 A 11/1881 Shafer
2,234,663 A 3/1941 Anderegg
(Continued)

FOREIGN PATENT DOCUMENTS

CN 2807407 8/2006
CN 101477590 1/2009
(Continued)

OTHER PUBLICATIONS

Anatomy of a Hard Disk Drive—Spindle Motor of 6—Hardware Secrets. retrieved date Apr. 8, 2019.*
(Continued)

*Primary Examiner* — Adam J Eiseman
*Assistant Examiner* — Mohammed S. Alawadi
(74) *Attorney, Agent, or Firm* — Alix, Yale & Ristas, LLP

(57) ABSTRACT

A system and method for physically destroying the data storage portion of electronic media electronic storage devices such as hard disk drives, solid state drives and hybrid hard drives that comprises a rotatable milling cutter and a cradle for locating the media electronic storage device in a positioned to engage the milling cutter. An integrated computer is included containing a data base of various parameters of different types of hard drives available. A scanning system determines information about the type of media electronic storage device being introduced in the system to be destroyed and conveys the such information to the computer whereby the data base may be used to provide information to properly locate the cradle and milling cutter to destroy the data storage portion and for printing out a certificate of destruction specifically identifying the hard drive that has had it data destroyed. A slug cutter is provided to retrieve slugs containing the rare earth metal after the data storage portion is destroyed.

15 Claims, 25 Drawing Sheets

(51) Int. Cl.
  *G06T 7/70*     (2017.01)
  *B23K 26/362*   (2014.01)
  *G06K 7/10*     (2006.01)
  *G06K 9/32*     (2006.01)
  *B02C 18/00*    (2006.01)
  *B23K 26/361*   (2014.01)
  *G11B 5/024*    (2006.01)
  *B23K 26/36*    (2014.01)
  *B23C 3/00*     (2006.01)
  *B23K 101/36*   (2006.01)

(52) U.S. Cl.
  CPC ....... *G06K 7/10821* (2013.01); *G06K 9/3216* (2013.01); *G06T 7/70* (2017.01); *B02C 2018/0015* (2013.01); *B23K 2101/36* (2018.08)

(58) Field of Classification Search
  CPC ............... G11B 5/0245; G06K 9/3216; G06K 7/10821; G06T 7/70; B23C 3/04; B23C 3/00; B02C 19/20; B02C 25/00; B02C 2018/0015
  USPC ...... 241/36, 14, 277, 278.1, 280, 101.2, 270
  See application file for complete search history.

(56) References Cited

U.S. PATENT DOCUMENTS

| | | |
|---|---|---|
| 2,745,319 A | 5/1956 | Sawyer |
| 2,980,151 A | 4/1961 | Arbour |
| 3,162,845 A | 12/1964 | Stuart-Williams |
| 3,237,362 A | 3/1966 | Fromson |
| 3,587,391 A | 6/1971 | Pitts et al. |
| 4,693,644 A | 9/1987 | Takahashi |
| 4,721,257 A | 1/1988 | Williams et al. |
| 4,729,713 A | 3/1988 | Takaichi et al. |
| 4,765,784 A * | 8/1988 | Karwan ............. G05B 19/4166 408/13 |
| 4,779,810 A | 10/1988 | Frey |
| 4,880,065 A | 11/1989 | McDonald et al. |
| 5,009,038 A | 4/1991 | Yoshikawa et al. |
| 5,064,126 A | 11/1991 | Hickey et al. |
| 5,149,948 A | 9/1992 | Chisholm |
| 5,203,067 A | 4/1993 | Defazio |
| 5,236,139 A | 8/1993 | Radtke |
| 5,384,956 A | 1/1995 | Sakurai et al. |
| 5,518,190 A | 5/1996 | Aebi et al. |
| 5,871,313 A | 2/1999 | Nenadic et al. |
| 5,930,217 A | 7/1999 | Kayanuma |
| 5,995,459 A | 11/1999 | Kappel et al. |
| 6,039,637 A | 3/2000 | Hutchison et al. |
| 6,065,911 A | 5/2000 | Almblad et al. |
| 6,089,434 A | 7/2000 | Gleason |
| 6,137,893 A | 10/2000 | Michael et al. |
| 6,241,141 B1 | 6/2001 | Al-Nabulsi |
| 6,311,100 B1 | 10/2001 | Sarma et al. |
| 6,375,106 B1 | 4/2002 | Sears |
| 6,478,515 B1 | 11/2002 | Mueller |
| 6,588,691 B2 | 7/2003 | Yamamoto et al. |
| 6,651,859 B2 | 11/2003 | Raffoni |
| 6,685,119 B2 | 2/2004 | Castronovo |
| 6,695,240 B2 | 2/2004 | Rajewski |
| 6,704,982 B1 | 3/2004 | Cassase et al. |
| 6,725,164 B1 | 4/2004 | Gadh et al. |
| 6,752,687 B2 | 6/2004 | Benning et al. |
| 6,902,469 B2 | 6/2005 | Kondo et al. |
| 6,912,775 B1 | 7/2005 | Pfeiffer et al. |
| 7,043,055 B1 | 5/2006 | Silver |
| 7,090,156 B2 | 8/2006 | Castronovo |
| 7,090,214 B2 | 8/2006 | Castronovo |
| 7,100,852 B2 | 9/2006 | Castronovo |
| 7,175,116 B2 | 2/2007 | Castronovo |
| 7,198,213 B2 | 4/2007 | Kolbet et al. |
| 7,204,436 B2 | 4/2007 | Castronovo |
| 7,239,399 B2 | 7/2007 | Duquette et al. |
| 7,240,864 B2 | 7/2007 | Castronovo |
| 7,308,543 B2 | 12/2007 | Kishi |
| 7,311,277 B2 | 12/2007 | Watanabe et al. |
| 7,334,747 B2 | 2/2008 | Castronovo |
| 7,357,340 B2 | 4/2008 | Castronovo |
| 7,363,317 B2 | 4/2008 | Meliksetian et al. |
| 7,427,040 B2 | 9/2008 | Castronovo |
| 7,448,562 B2 | 11/2008 | Castronovo |
| 7,539,339 B2 | 5/2009 | Tanabe et al. |
| 7,562,836 B2 | 7/2009 | Langston |
| 7,588,206 B2 | 9/2009 | Hausman et al. |
| 7,607,598 B2 | 10/2009 | Castronovo |
| 7,667,923 B1 | 2/2010 | Chontos et al. |
| 7,753,762 B2 | 7/2010 | Hutchinson et al. |
| 7,761,183 B2 | 7/2010 | Sullivan |
| 7,880,463 B2 | 2/2011 | Guzik et al. |
| 7,959,381 B2 | 6/2011 | Kienzle |
| 8,113,748 B2 * | 2/2012 | Werner ............... B23B 51/0453 408/204 |
| 8,251,303 B2 | 8/2012 | Wozny |
| 8,364,306 B2 | 1/2013 | Rodriguez et al. |
| 8,610,942 B2 | 12/2013 | Eguchi |
| 8,851,404 B2 | 10/2014 | Clark et al. |
| 2001/0009534 A1 | 7/2001 | Sato |
| 2003/0213531 A1 | 11/2003 | Conry |
| 2004/0050420 A1 | 3/2004 | Huang et al. |
| 2004/0252628 A1 | 12/2004 | Detzler |
| 2005/0257049 A1 | 11/2005 | Farag |
| 2006/0072244 A1 | 4/2006 | Rapp |
| 2007/0063082 A1 | 3/2007 | Coleman |
| 2007/0076537 A1 | 4/2007 | Klein |
| 2007/0147776 A1 | 6/2007 | Ito |
| 2008/0175684 A1 | 7/2008 | Schmidt et al. |
| 2009/0127341 A1 | 5/2009 | Feng |
| 2010/0145498 A1 | 6/2010 | Uchikawa et al. |
| 2010/0294865 A1 | 11/2010 | Wozny |
| 2011/0069322 A1 | 3/2011 | Hoffer, Jr. |
| 2011/0085863 A1 | 4/2011 | Shih |
| 2011/0305250 A1 | 12/2011 | Chann et al. |
| 2012/0091237 A1 | 4/2012 | Clark et al. |
| 2012/0137829 A1 | 6/2012 | Harris et al. |
| 2012/0292415 A1 | 11/2012 | Wozny |
| 2013/0124620 A1 | 5/2013 | Madej |
| 2013/0222947 A1 | 8/2013 | Sugii et al. |
| 2014/0238962 A1 | 8/2014 | Nawrodt et al. |
| 2014/0263216 A1 * | 9/2014 | Clark ................... B23C 1/08 219/121.7 |
| 2015/0352671 A1 | 12/2015 | Darzi |

FOREIGN PATENT DOCUMENTS

| | | |
|---|---|---|
| CN | 101789254 | 7/2010 |
| CN | 101794334 | 8/2010 |
| CN | 101954500 | 1/2011 |
| CN | 102319723 | 1/2012 |
| CN | 102661706 | 9/2012 |
| DE | 4435670 | 4/1996 |
| EP | 0375526 A1 | 6/1990 |
| EP | 0503753 A1 | 9/1992 |
| EP | 0959654 | 11/1999 |
| EP | 1065962 | 11/2001 |
| EP | 1640920 | 3/2006 |
| EP | 1032912 | 8/2007 |
| GB | 2329298 A | 2/2004 |
| WO | WO2012072989 | 6/2012 |
| WO | WO2012137063 | 10/2012 |

OTHER PUBLICATIONS

The Four Major Components of a Hard Drive, retrieved date Apr. 9, 2019.*
Search Report and Written Opinion dated Jan. 6, 2015.
Search Report and Written Opinion dated Sep. 27, 2016.

* cited by examiner

Hard Drive Destruction Machine's Operating System

Barcode reader system

Database of all manufacturer's barcodes
of 3.5 inch and 2.5 inch HDDs, SSds, and HHds.

Capacity to capture corporate asset tags.

Capacity to read QR and Matrix Codes.

Capacity to save the retrieved information as a Word document or convert it to a PDf that can be stored for future use or delivered electronically to another computer, smartphone or tablet.

Product visioning system

Pictorial database of targeted components in all 3.5 inch and 2.5 inch HDDs, SSds, and HHDs. The primary components consist of: the hard drive cover, circuit boards, and rare earth metals that including the voice-coil magnets, and spindle coils.

Corresponding x, y, and z numerical coordinates to aid in the identification, destruction and/or ectraction of the targeted components.

G-code/conversational programming system

Pictorial database of targeted components in all 3.5 inch and 2.5 inch HDDs, SSds, and HHDs. The primary components consist of: the hard drive cover, circuit boards, and rare earth metals that including the voice-coil magnets, and spindle coils.

Corresponding x, y, and z numerical coordinates to guide the tool path of the milling tool to remove targeted components from the outside to the inside of hard drives.

Pictorial database of rare earth metals, voice-coil magnets and spindle coils, in all 3.5 inch and 2.5 inch HDDs, and HHDs.

Corresponding x, y, and z numerical coordinates to aid in the identification, destruction and/or ectraction of the targeted components.

FIG. 1a

Certificate of Destruction — 100

Company receiving the service.

Name of Person authorizing the destruction process.

Company personnel witnessing the destruction process.

The tima and date of the destruction.

Name of the technician performing the process.

Running count of sub-components collected.

Running count of sub-components and their respective weights.

Additional dismantling demographic variables as needed.

Manufactures's barcodes with corresponding corporate asset tags.

_____     _____     _____
_____     _____     _____
_____     _____     _____
_____     _____     _____

Retieved QR and Data Matrix Code information:

_____
_____
_____
_____
_____

Certificate can be prinred immediately or saved to a Word document or converted to a PDF that can be stored for future use or delivered electronically to another computr, smartphone or tablet.

FIG. 24

PRODUCT VERIFICATION FOR HARD DRIVE DATA DESTROYING DEVICE

CROSS-REFERENCE TO RELATED APPLICATIONS

This application claims the benefit of U.S. Provisional Application No. 62/188,039, entitled "Product Verification for Hard Drive Data Destroying Device", filed Jul. 2, 2015, the disclosure of which is incorporated herein by reference in its entirety.

TECHNICAL FIELD

This application relates generally to a system for the destruction of the data on a hard drive and, more particularly, to the production verification of the particular hard drive being destroyed and to the capturing of rare earth metals.

BACKGROUND

Various types of data are stored on the hard drives of computers. Such data may include personal confidential information concerning individuals. This data may include their social security numbers, financial information, health information and private telephone numbers as examples. The hard drives are also used to store corporate information which may include proprietary information such as developing products, customer lists, and business plans. The government may store confidential information including highly classified information on the hard drives.

When it is desired to replace the computer, the data must be removed from the hard drive so that it cannot be misused by unscrupulous individuals. Merely erasing the data by using the computer commands is not sufficient as the data can be recaptured. This is true even if the hard drive is removed for upgrade purposes. However, even if the hard drive is removed, something must be done to destroy the data.

One way of ensuring that the data cannot be used or recovered from an unwanted hard drive is to completely destroy the hard drive. This has been accomplished in the past by completely shredding the entire hard drive. However, as the hard drive is encased in a metal, the complete destruction involves the shredding of a relatively large volume of metal that requires a lot of energy.

Additionally, hard dives use rare earth elements in their construction. Rare earth elements include cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb) and yttrium (Y). It is becoming desirable to recycle such elements. The complete destruction of a hard drive does not readily permit the recapture of such elements.

It is thus desirable to have a process and apparatus for destroying the data on a hard drive that doesn't destroy the entire hard drive leaving at least a portion of the casing as well as the hub and magnets remaining to recapture the components of the hard drive containing the rare earth elements.

An example of a hard drive data destroying device that does not destroy the entire hard drive is shown and described in U.S. Pat. No. 8,851,404 entitled Hard Drive Shredding Device, issued Oct. 7, 2014 by Clark et al., the disclosure of which is incorporated herein by reference in its entirety. Another example of such a hard drive data destroying device is shown in co-pending U.S. patent application Ser. No. 14/202,234 entitled Hard Drive Shredding Device, filed Mar. 12, 2013 by Clark et al., the disclosure of which is also incorporated herein by reference in its entirety.

SUMMARY

According to one aspect of this disclosure there is provided a system for physically destroying the data storage portion of electronic media electronic storage devices such as hard disk drives, solid state drives and hybrid hard drives. The system comprises a rotatable milling cutter and a cradle for locating the media electronic storage device in a positioned to engage the milling cutter, the cutter and/or the cradle being axially movable to permit the milling cutter to engage and remove the data storage portion of the electronic media storage device while leaving at least a substantial portion of the remaining electronic media storage device intact. An integrated computer is provided containing a data base of various parameters of different types of hard drives available and a scanning system is provided for determining information about the type of media electronic storage device being introduced in the system to be destroyed and conveying such information to the computer whereby the data base may be used to provide information to properly locate the cradle and milling cutter to destroy the data storage portion and for printing out a certificate of destruction specifically identifying the hard drive that has had its data containing portion destroyed.

According to another aspect there is provided a system for physically destroying the data storage portion of electronic media electronic storage devices such as hard disk drives, solid state drives and hybrid hard drives and retrieving rare earth metals comprising a rotatable milling cutter and a cradle for locating the media electronic storage device in a positioned to engage the milling cutter. The cutter and/or said cradle is axially movable to permit the milling cutter to engage and remove the data storage portion of the electronic media storage device while leaving at least a substantial portion of the remaining electronic media storage device intact. An integrated computer containing a data base of various parameters of different types of hard drives available is provided; A scanning system is provided for determining information about the type of media electronic storage device being introduced in the system to be destroyed and conveying such information to the computer whereby the data base may be used to provide information to properly locate the cradle and milling cutter to destroy the data storage portion wherein the voice coil magnets and spindle magnets remain after the destruction of the data storage portion of the electronic media storage device. A slug cutter is provided for removing a slug from the hard drive containing the voice coil magnets and a slug form the hard drive containing the spindle magnets.

According to yet another aspect there is provided method for physically destroying the data storage portion of electronic media electronic storage devices such as hard disk drives, solid state drives and hybrid hard drives and recapturing the rare earth metals contained in various components of the electronic media, comprising using a milling cutter to engage and remove the data storage portion of an electronic media storage device inserted in said device while leaving at least a substantial portion of the remaining electronic media storage device intact; and thereafter, using a slug cutter for removing slugs from the storage device containing the rare earth metals.

BRIEF DESCRIPTION OF THE DRAWINGS

FIG. 1a is a description of the operating system of a machine used for the destruction of hard drives;

FIG. 24 is an example of a Certificate Of Destruction provided after the operation is complete;

DETAILED DESCRIPTION

In general, the devices described herein can be used for destroying the data storage portion of electronic media storage devices such as HDD, SSD, and HHD hard drives. The HDD (Hard Disc Drive) hard drive is contains a hub from which a metal platter or platters with a magnetic coating extend. The coating stores the data. The coated platters constitute the data storage portion of the hard drive. A read/write head on an arm accesses the data while the platters are spinning on a spindle in a hard drive housing. The housing includes a cover and bottom enclosure. In SSD (Solid State Drive) hard drives, instead of the magnetic coating on top of platters; the data is stored on NAND flash memory (information pods). The SSD drive has no moving parts. The HHD (Hybrid Hard Drive) drive is a hybrid incorporating the HDD and the SSD principles. The various devices described herein can be used to destroy data on all three types of hard drives, while leaving a major portion of the hard drive components containing the rare earth elements in tack for recapture; and making it possible for the retrieval of their respective circuit boards.

Figure 1:
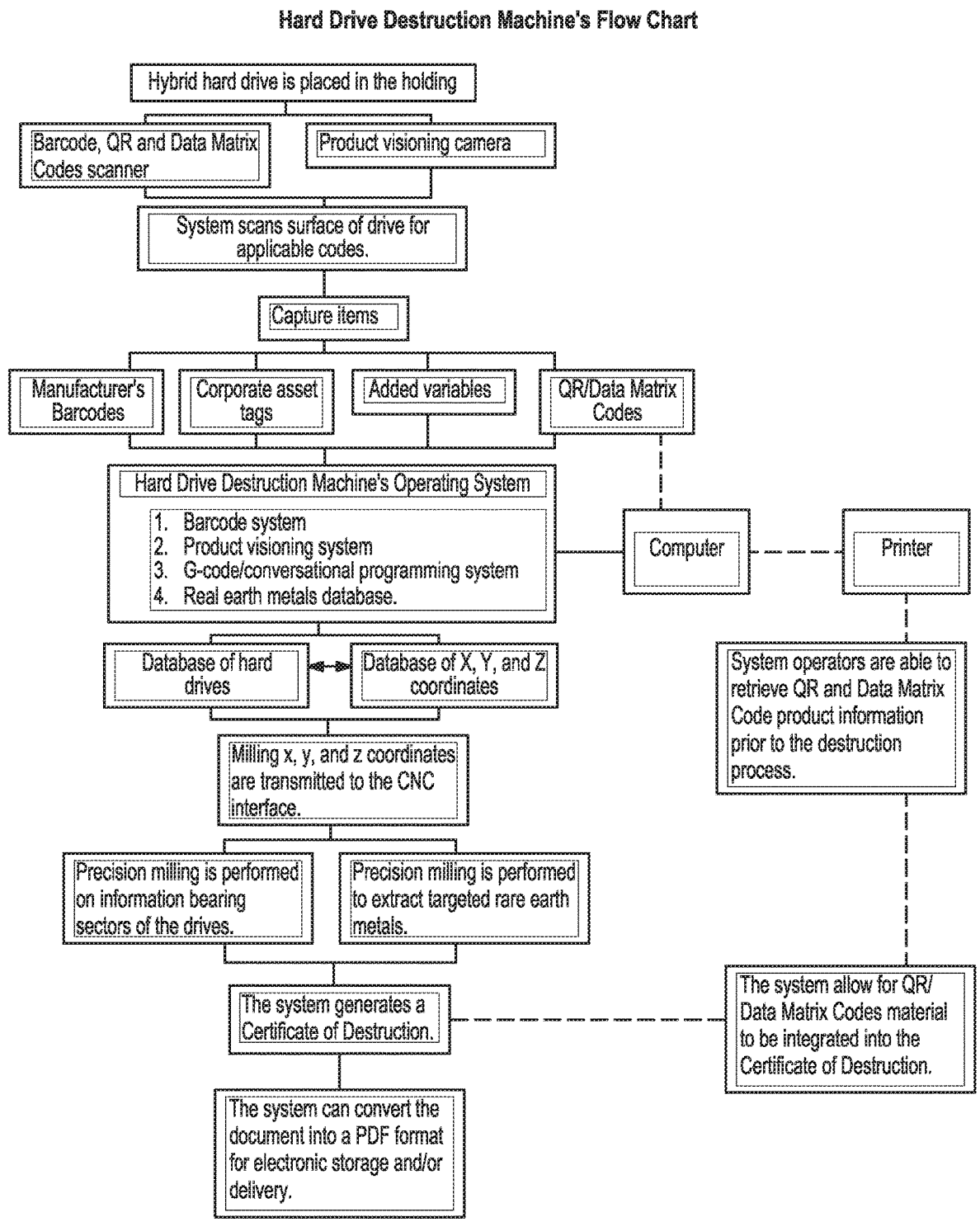
FIG. 1 is flow chart of the operation of the system.
Figure 2A:
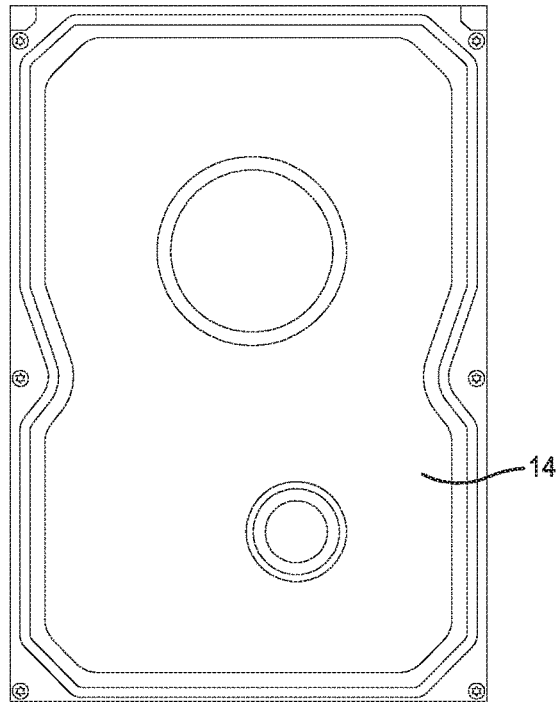
FIGS. 2a-2d are views of various components of a hard drive that may be desired to be recovered from the destruction process.
Figure 2B:
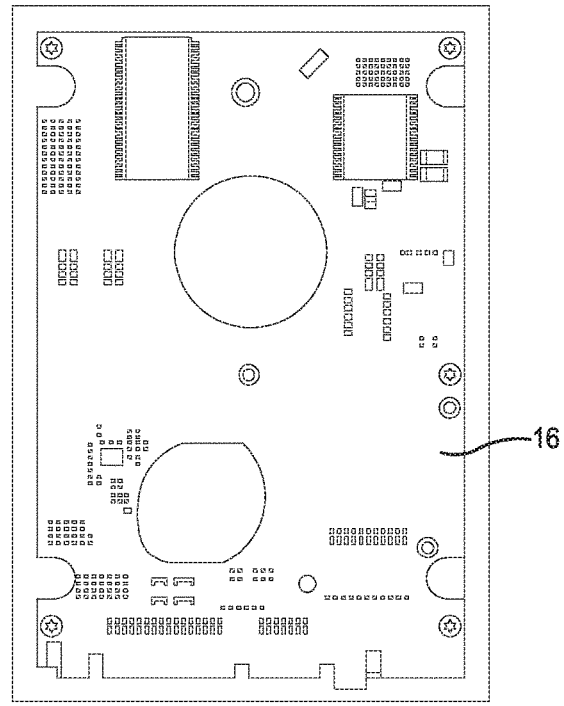
Figure 2C:
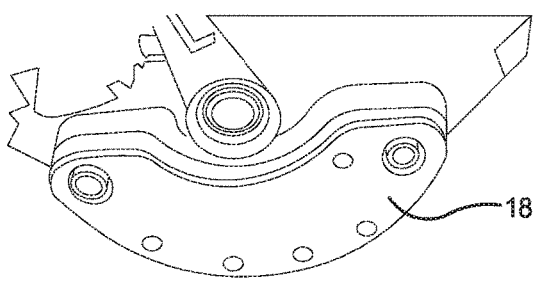
Figure 2D:
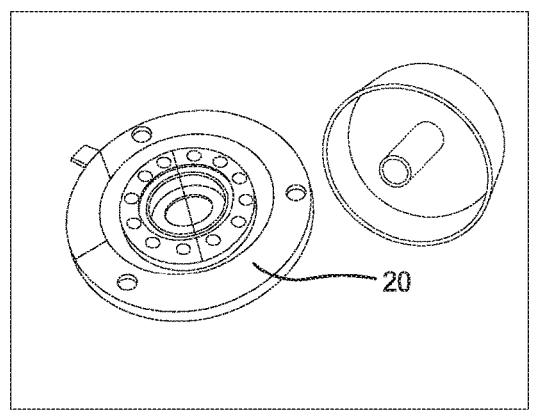

As outlined in the flow chart of FIG. 1, the destruction process is initiated when the hard drive 2 in its housing is placed in the holding chassis or cradle 4 of the data destroying machine 6. Then the drive 2 is automatically indexed into the data destroying machine's milling chamber 8 where a code reader 10 scans the cover of the drive for its manufacturer's barcode 12 and other appropriate indicators, which are used to identify the make and model of the hard drive. The data destroying machine's operating system will also simultaneously scan the hard drive with a product visioning camera or integrated smart camera to aid in drive recognition, orientation and positioning of the milling tool. During the initial scanning of the hard drive, the system will also have the capacity to read QR and Data Matrix Codes that are present. The information retrieved may consist of a link to the manufacturers' or supporting companies' website; and provide text content like the make and model of the respective drives; circuit board and rare earth metal locations as well as recovery instructions. The operating system of the destruction machine can print the retrieved QR and Data Matrix Code information prior to beginning or upon completion of the destruction process. The destruction machine's system also has the capacity to save the retrieved information as a Word document or convert it to a PDF that can be stored for future use or delivered electronically to another computer, smartphone or tablet.

Figure 3:
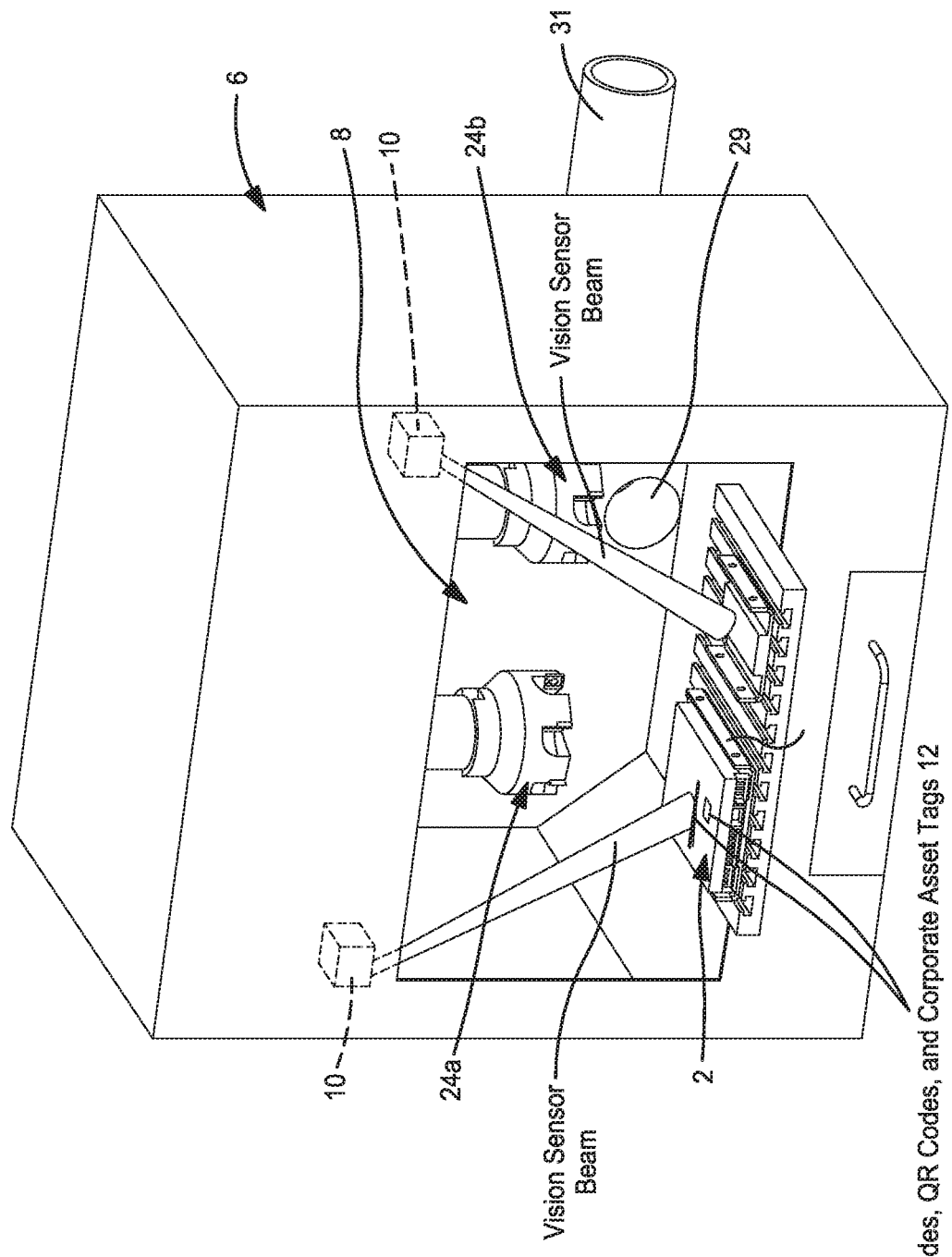
FIG. 3 is an isometric view of a hard drive data destroyer machine showing the visual verification of a hard drive positioned in the milling chamber.

The present system includes an operating system that integrates the following, but has the capacity to be configured into one integrated system or expanded to more than the four systems currently listed. Further, the algorithm of the present embodiment's operating system has the capacity to be integrated, in part or in total, into other manufacturers' systems that are currently being developed or developed in the future. The four systems include:

1). A barcode reader system that has a database of all the manufacturers' barcodes of 3.5 inch and 2.5 inch HDDs, SSDs, and HHDs that are currently or were formally available in the market. The manufacturers' barcodes that are captured with the reader will help the overall system determine the specific type of hard drive placed in the holding chassis, either a 3.5 inch or 2.5 inch HDD, SSD, or HHD, which will be conveyed to the product visioning database and G-code or conversational programming database to aid in the selection of the appropriate destruction procedure and recovery sequence performed on the respective drives. The barcode reading system will have the capacity to capture corporate asset tags placed on the hard drives and couple them with their corresponding manufactures' barcode. The barcode reading system will also have the capacity to read QR and Data Matrix Codes that are directly applied by the manufacturer or third-party source like a governmental agency, public/private corporation or organization. The information retrieved may consist of a link to the manufacturer's or supporting company's website. The code may also provide text content like the make and model of the respective drives as well as specs on the drives' circuit boards along with recovery instructions. When the QR or Data Matrix Codes of a HDD or HHD drive are scanned as shown in FIG. 3 it may also provide the location of the drives' rare earth metals; specific dismantling instructions, shipping instructions to appropriate processing facilities, and current commodities pricing. As stated earlier, the operating system of the destruction machine can print the retrieved QR and Data Matrix Code information prior to beginning or upon completion of the destruction process. The destruction machine's system also has the capacity to save the retrieved information as a Word document or convert it to a PDF that can be stored for future use or delivered electronically to another computer, smartphone or tablet.

2). A product visioning system with a database comprised of all the 3.5 inch and 2.5 inch HDDs, SSDs, and HHDs that are currently or were formally available in the market. Each hard drive in the database will have images of their respective components shown in FIGS. 2a-2d primarily consisting of: a). the cover 14 of the drive, mainly for added product recognition and product orientation within the milling chamber; b). circuit boards 16, c). voice-coil magnets 18, and d). spindle coil 20. The captured images will have corresponding x, y, and z numerical coordinates to aid in the destruction or extraction of their targeted components. The product visioning database will also have the capacity to integrate images and coordinates of other desired components to extract from the drive.

3). A G-code or conversational programming system with a database comprised of all the 3.5 inch and 2.5 inch HDDs, SSDs, and HHDs that are currently or were formally available in the market. The database will also contain pictorial images of the targeted components shown in FIGS. 2a-2d from the respective drives. The drives' pictorial images will be accompanied with corresponding tool path coordinates to direct the systematic movement of the milling tools in the destruction or removal of selected components from the hard drive. Each of the operating system's databases will have the capacity to integrate information from newly developed memory drives that are produced in the future.

4). The present system will also consists of a database, which is comprised of a pictorial database of the rare earth metals locations and their corresponding x, y, and z numerical coordinates on all 3.5 inch and 2.5 inch HDDs and HHDs that are currently or formerly available on the market. The database has the capacity to integrate newly developed memory drives, containing rare earth metals; and other desired components that are produced in the future.

Based on the type of drive identified in the holding chassis, the destruction machine's operating system will convey specific milling coordinates to the CNC interface for either a 3.5 inch or a 2.5 inch HDD, SSD or HHD destruction method. Along with the type of drives stored in the program's database are the drives' corresponding x, y, and z numerical coordinates, which are used to direct the milling bit in removing the data portion of the hard drives. The system's x, y, and z numerical coordinates can also be adapted for use with a CNC laser application for destroying the data portion of hard drives.

When a HDD drive is identified in the holding chassis, the x, y, and z numerical coordinates, associated with the specific drive, will be used to indicate where the spindle hub holding the information platter(s) are located. The CNC milling head(s), one or more, will proceed to remove the information platters from around the spindle hub.

Figure 4:
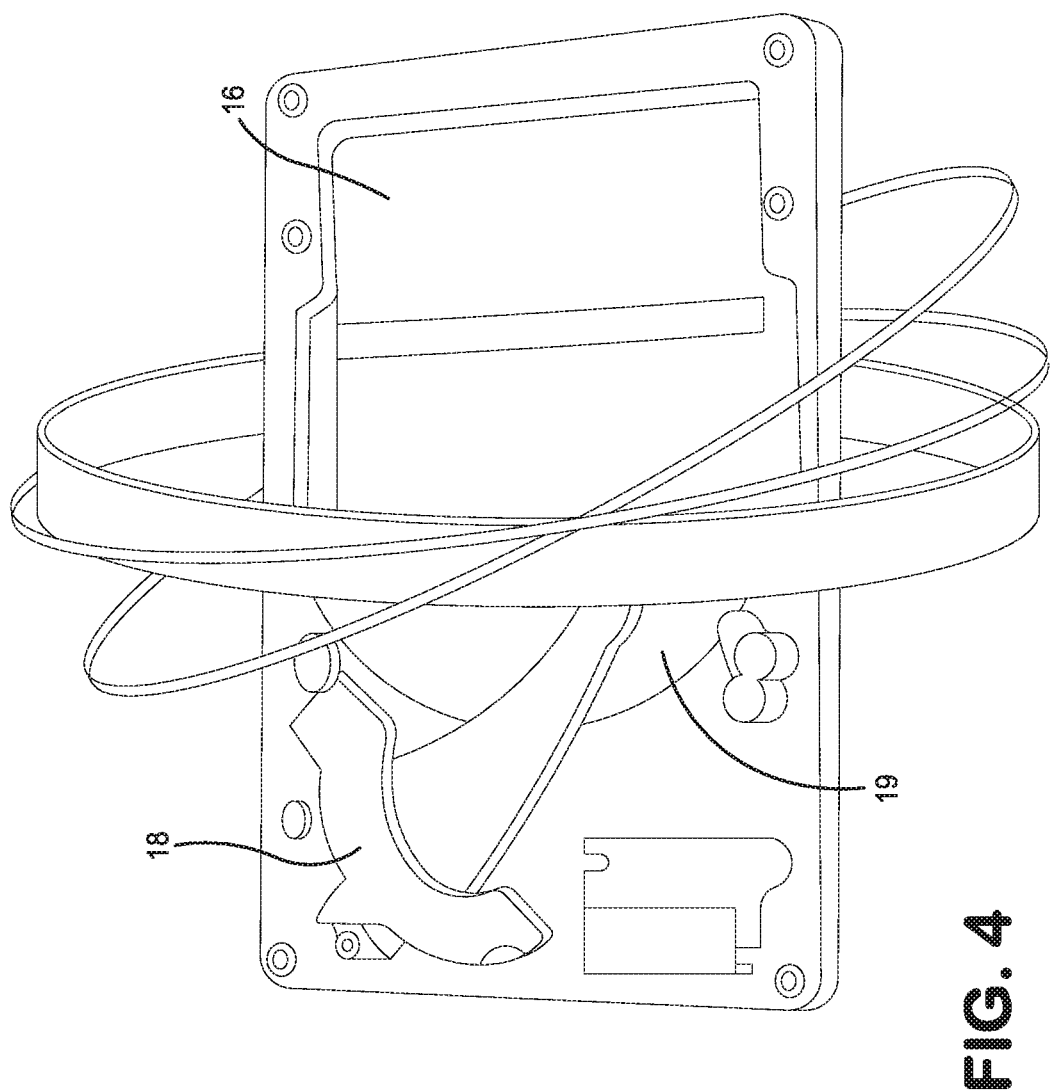
FIG. 4 is a cutaway plan view of a hybrid hard drive (HHD.

When a SSD drive such as shown in FIG. 4 is identified in the holding chassis, the x, y, and z numerical coordinates associated with the specific drive, are conveyed to the CNC interface for the milling head(s) to perform a face milling procedure that will remove the NAND flash memory, information pods, from the surface of the circuit board. The controlled depth of milling will allow for the information pods of the SSD to be removed without disrupting the remaining portion of the circuit board, which provides a higher rate of return when recycling or completely mill the circuit board to meet more rigorous data security guidelines.

When a HHD is identified in the holding chassis, the x, y, and z numerical coordinates direct the milling head(s) 24 to perform a two-step destruction process on the hard drive. The majority of HHDs are manufactured with the platters on top; and the circuit board on the bottom. As a result, the present embodiment describes destruction of the HHD starting with the platters followed by the circuit board. However, the hard drive recognition system within the present embodiment has the capacity to recognize when the destruction sequence should start with the circuit board first followed by the platters. When the manufacture's sequence for HHDs has the circuit board 16 positioned over the platters, then the two-step destruction process has to be paused between step one and step two, if it is the intension of the operator to retrieve the circuit board 16. Once the circuit board 16 has been removed, then step two of the destruction process can be resumed by milling the HDD platters. An automated interface for removing the circuit board can be used to eliminate the manual extraction of the circuit board between steps (not shown). The controlled depth of milling on the HHD circuit board, as well as the SSD circuit board, will allow for the NAND flash memory, information pods, to be removed without disrupting the remaining portion of the circuit board, which provides a higher rate of return when recycling, or completely mill the circuit board to meet more rigorous data security guidelines.

Figure 5:
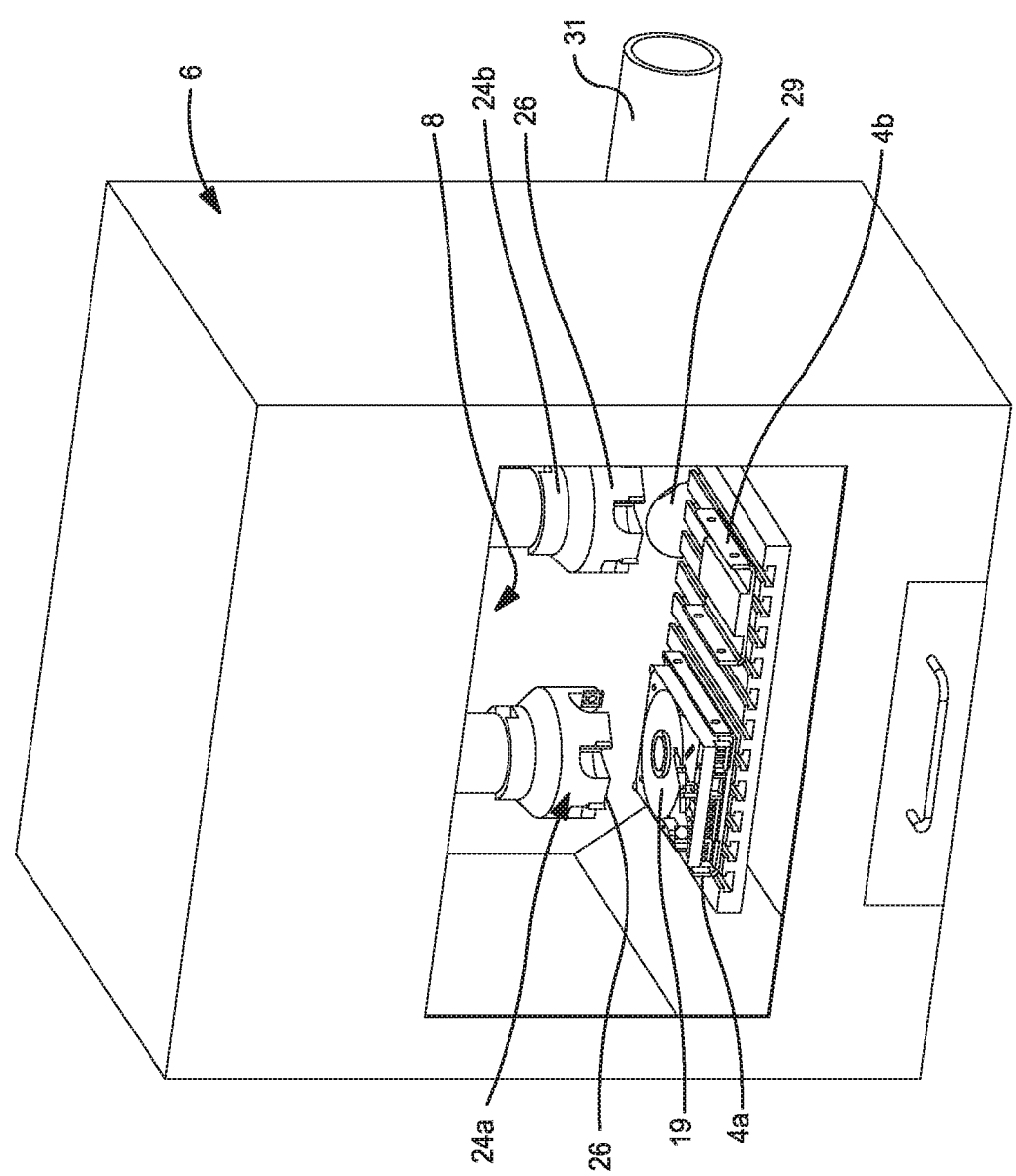
FIG. 5 is an isometric view of a hard drive data destroyer machine showing the hard drive positioned in the milling chamber before being engaged by the milling tool.

As shown in FIG. 5, the described system for destroying HHDs uses a dual port chassis or cradle 4a or 4b, which is mounted on the system's loading table 22. The larger 3.5 inch HHDs are placed in the holding chassis 4a on the left, while the smaller 2.5 inch HHDs are placed in the holding chassis 4b on the right. The placement of the hard drives corresponds with the appropriately sized mill heads, which are mounted on the CNC guide rails (not shown) inside the milling chamber 8. Although the present embodiment describes a dual mechanism for destroying both 3.5 inch and 2.5 inch drives, the dual system can also be configured as a separate system for either a 3.5 inch or 2.5 inch drives. The loading process can be done automatically by placing the respective hard drives in a "magazine" styled loading chassis, which indexes the hard drives into the empty hard drive holding chassis after the previous trepanning or surface milling cycle of a hard drive is complete.

Once the hard drive is placed in either the 3.5 or 2.5 inch holding chassis, the barcode on the face of the drive is scanned to identify the specific type of hard drive in the chassis. The loading table is automatically activated and moves inside the body of the milling chamber. The x, y, and z numerical coordinates received from the destruction machine's operating system are conveyed to the CNC interface for the milling heads to perform a two-step destruction process on the hard drive.

Figure 6:
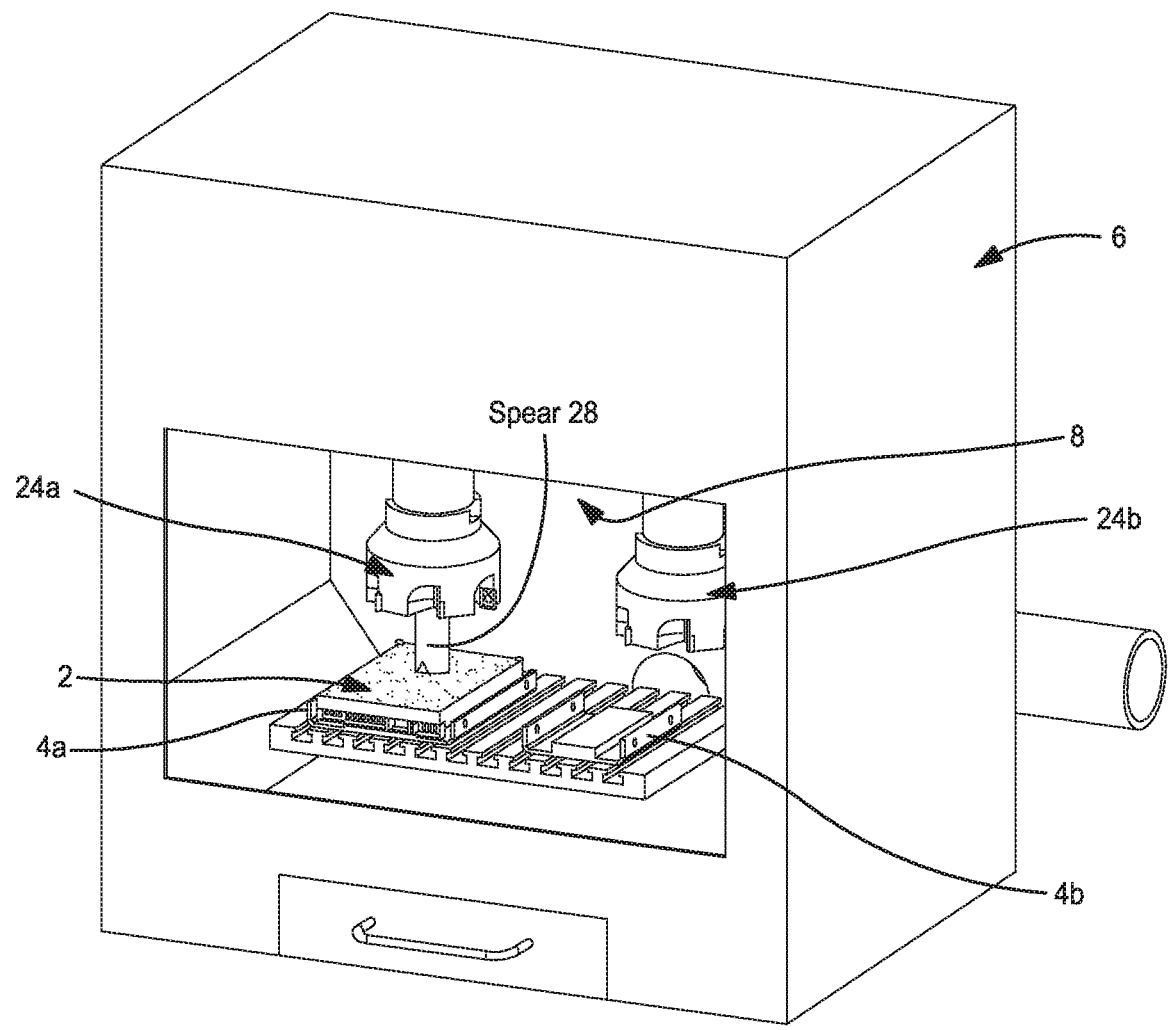
FIG. 6 is an isometric view of the hard drive data destroyer machine showing the center spear of the milling cutter engaging the hard drive.

Step one: the milling head 24a or 24b cores the platters from around the spindle hub. In the described device, the coring process is achieved by positioning a milling tool 24a or 24b in the form of custom Trepan tool 26 over the spindle hub of the 3.5 inch or 2.5 inch HHD. The custom Trepan tool 26 includes a circular cutting face that cores a donut shaped hole or groove and a hollow center through which a reciprocal holding spear 28 extends. As shown in FIG. 6 the Trepan, two-phase pneumatic, milling tool 24 will first lower the center holding spear 28, which applies pressure to the spindle hub of the hard drive preventing the hard drive platters from spinning during the milling process.

Figure 7:
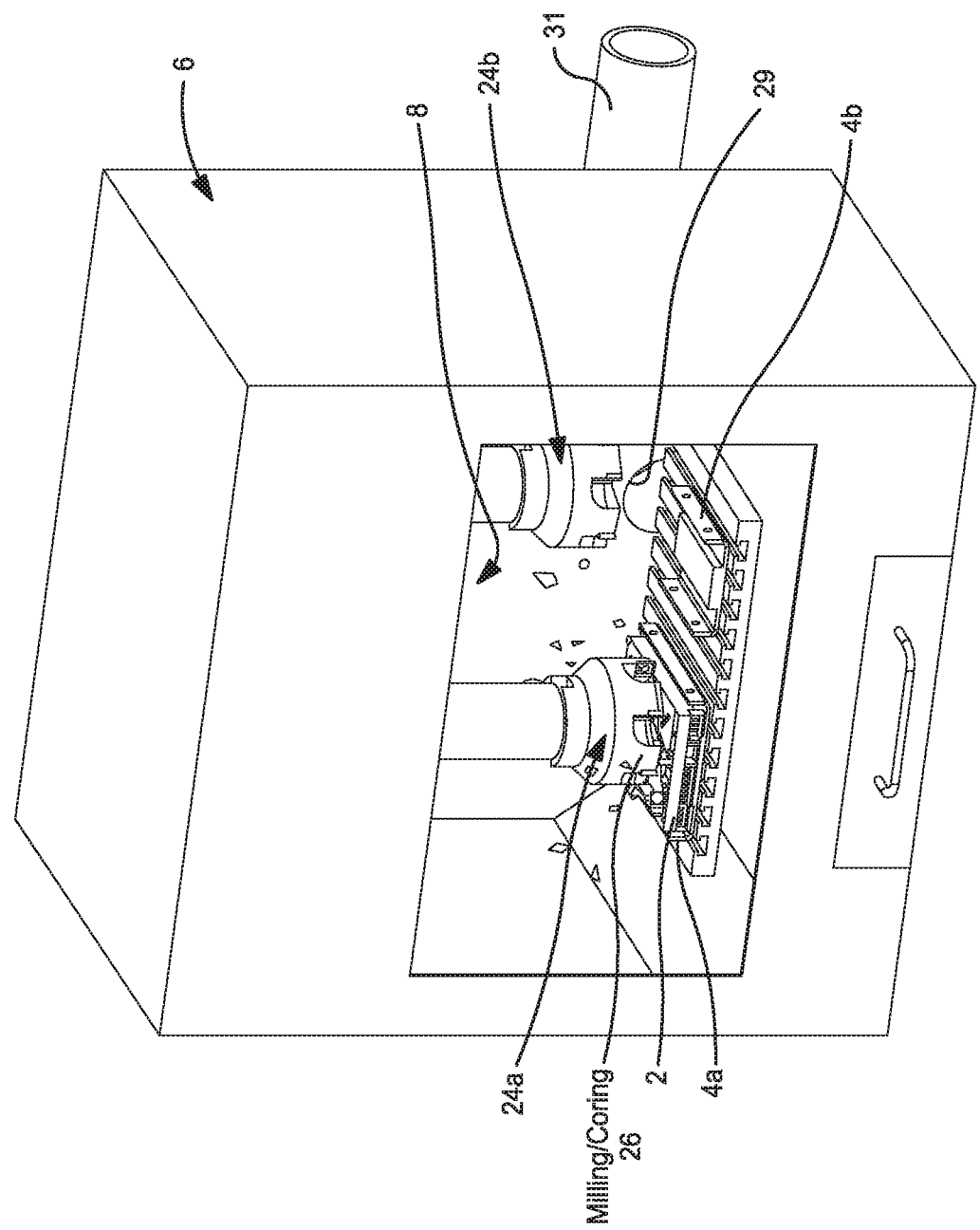
FIG. 7 is an isometric view of the hard drive data destroyer machine showing the trepan milling cuter engaging the hard drive.
Figure 8:
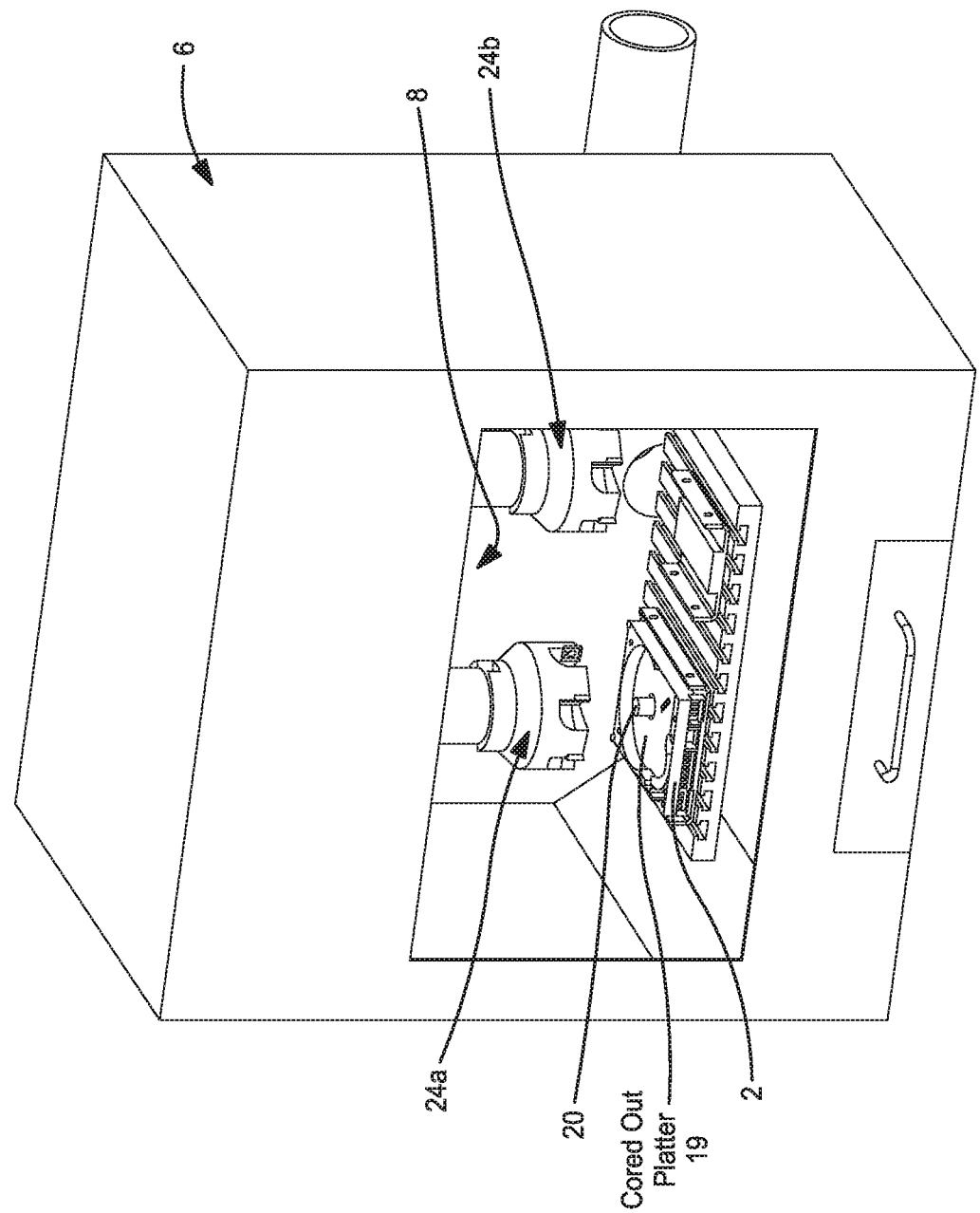
FIG. 8 is an isometric view of the hard drive data destroyer machine showing the hard drive after the milling cutter is disengaged from the hard drive.

As shown in FIG. 7, the Trepan milling tool 24a or 24b then penetrates the surface of the hard drive 2 coring-out the platters of the hard drive. When the platter milling process is complete, the two-phase milling tool retracts from the surface of the hard drive; and returns to the start position. As shown in FIG. 8, all that remains is the surrounding casing of the 3.5 inch or 2.5 inch hard drive and the center hub 20, which once held the information platter(s). The finished product resembles a donut.

As shown in FIGS. 9-12b, the first step of the HHD and HDD destruction process, which involves destroying the hard drive platters, can also be performed with one or more milling bits that penetrate the hard drive 30 from a horizontal position in relation to the drive's spindle hub.

Figure 9:
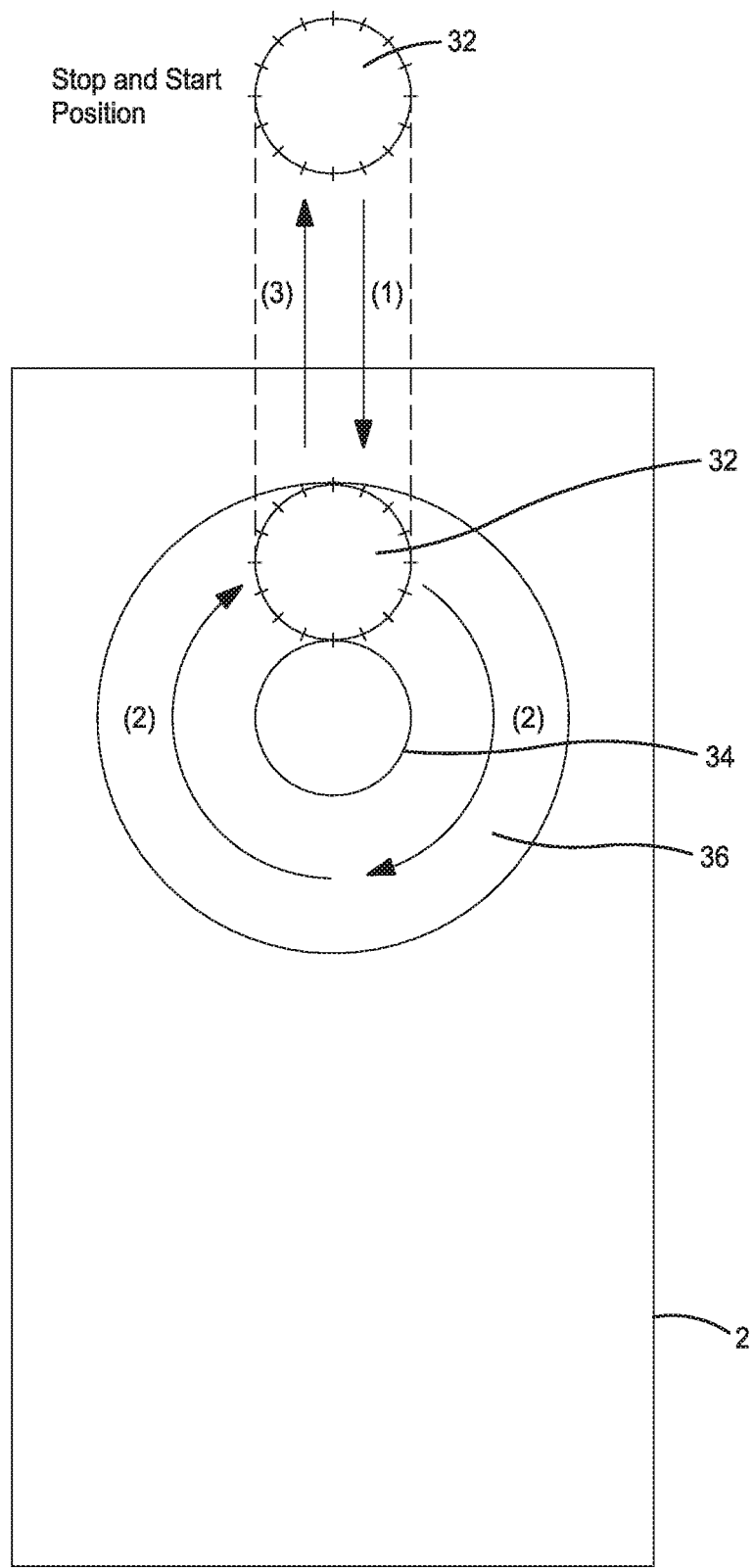
FIG. 9 is a schematic top view of an alternative method of milling the hard drive.

FIG. 9 shows schematically another method of shredding the platters. A single cutting tool 32 is mounted in a suitable mechanism that is guided in a track to move the cutting tool 32 toward the hub 34 of the hard drive 2. Once the rotating cutting blade of the cutting tool 32 pierces the outer portion of the hard drive 2 and reaches the platter hub 34, moving along the path indicated by the arrow (1), the cutting tool 32 follows a clockwise 360-degree cutting track around the platter hub 34, indicated by arrows (2), shredding the hard drive platters 36 so that the only thing that remains of the hard drive platters 36 are small metal shavings. Once the cutting tool 32 has completed the 360-degree cutting path around the hub 34, the cutting tool 32 returns to the start position along the path indicated by arrows (3).

Figure 10:
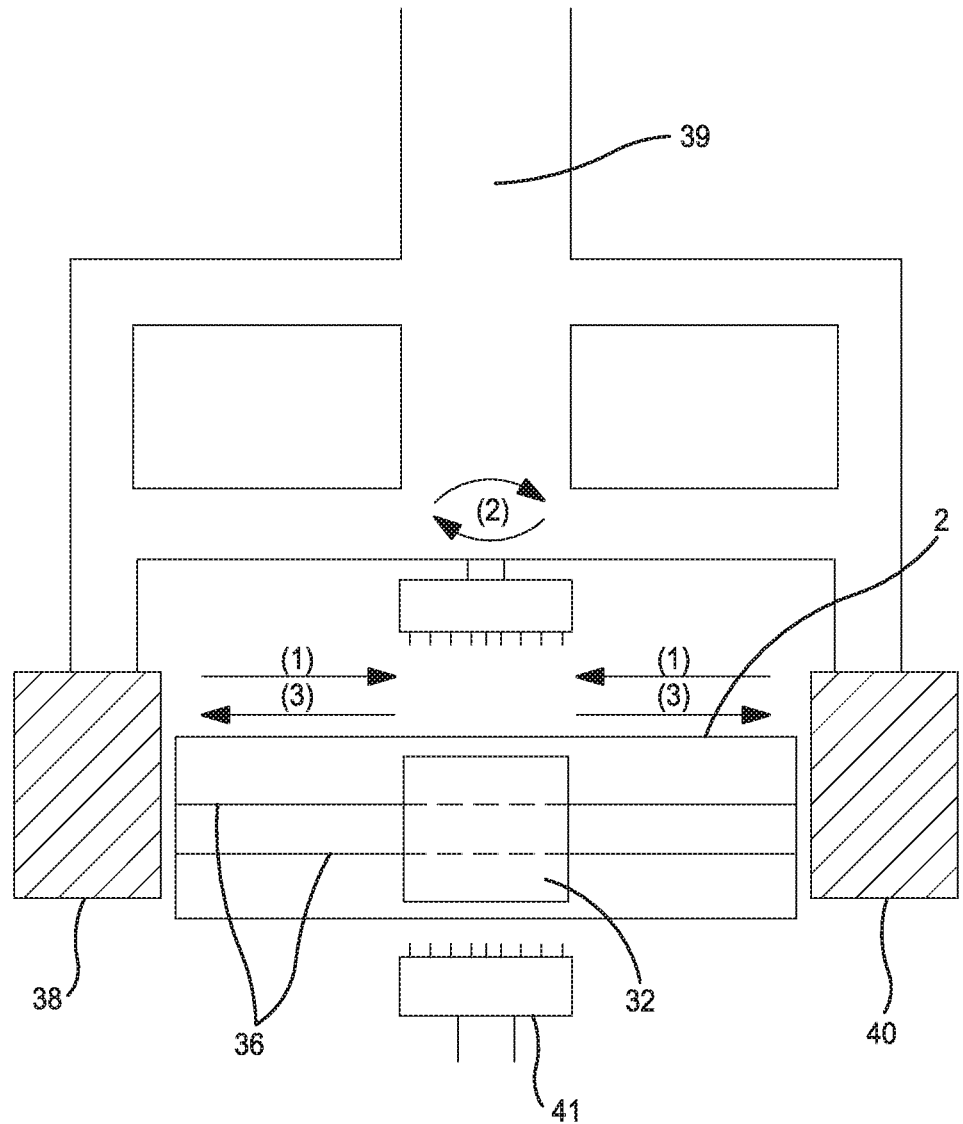
FIG. 10 is a schematic side view of another alternative method of milling the hard drive.
Figure 11:
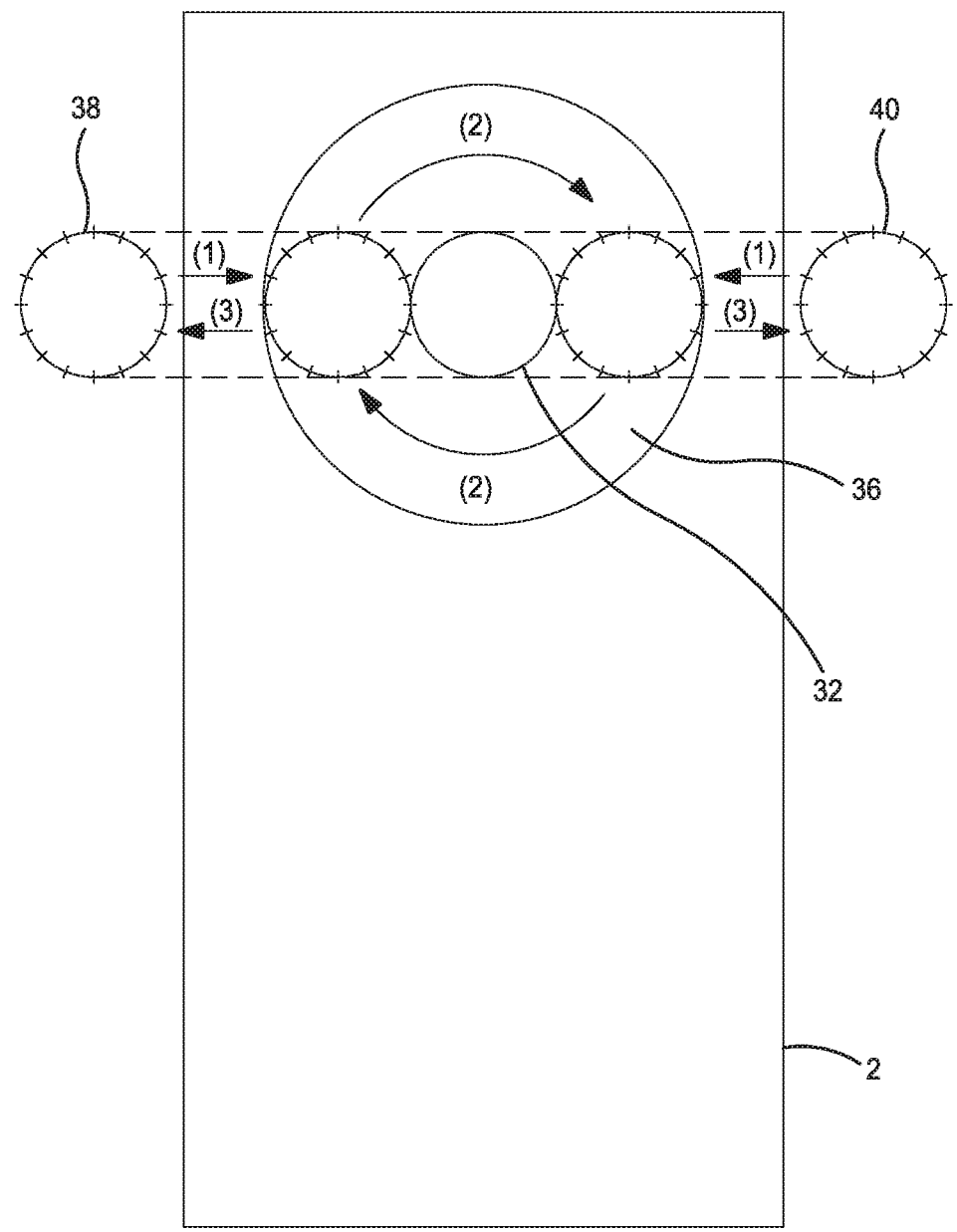
FIG. 11 is a schematic top view of the alternative method of milling the hard drive shown in FIG. 10.

FIGS. 10 and 11 show schematically yet another method of shredding the platters that utilizes two cutting tools 38 and 40. As shown, the cutting tools 38 and 40 are mounted one to either side of the hard drive 2. The cutting tools 38 and 40 are mounted on suitable mechanisms that can be moved in tracks to move each cutting tools 38 and 40 toward the hub 32 of the hard drive 2 in the direction indicated by the arrows (1). A hard drive platter clamp 41 clamps the hub 32 and prevents the platters 36 from spinning. Once the rotating cutting blades of the cutting tools 38 and 40 pierce the outer portions of the hard drive 118 and reach the platter hub 34, the mechanisms move the cutting tools 38 and 40 around an axis extending through the center of the hub 34 as shown. The cutting tool 38 is moved clockwise from nine to three o'clock and the other cutting tool 40 is moved clockwise from three to nine o'clock around the platter hub 34 as indicated by the arrows (2) leaving only shavings.

Once the cutting tools 38 and 40 complete the 180-degree cutting path around the platter hub 34, the movement of the cutting tools 38 and 40 is reversed and the cutting tools 38 and 40 are returned to their original position.

Figure 12:
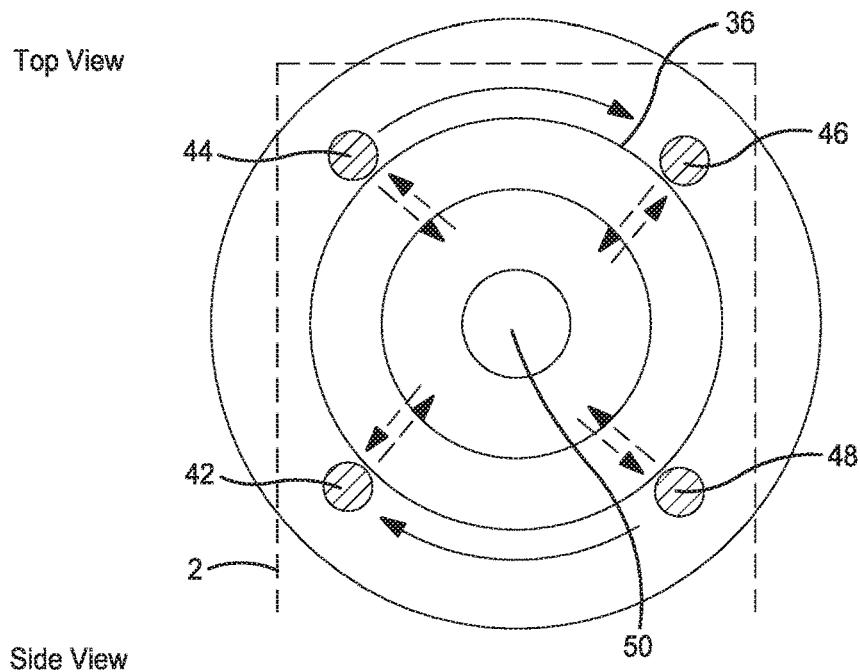
FIGS. 12 and 12a are schematic top and side views of yet another alternative method of milling the hard drive.
Figure 12A:
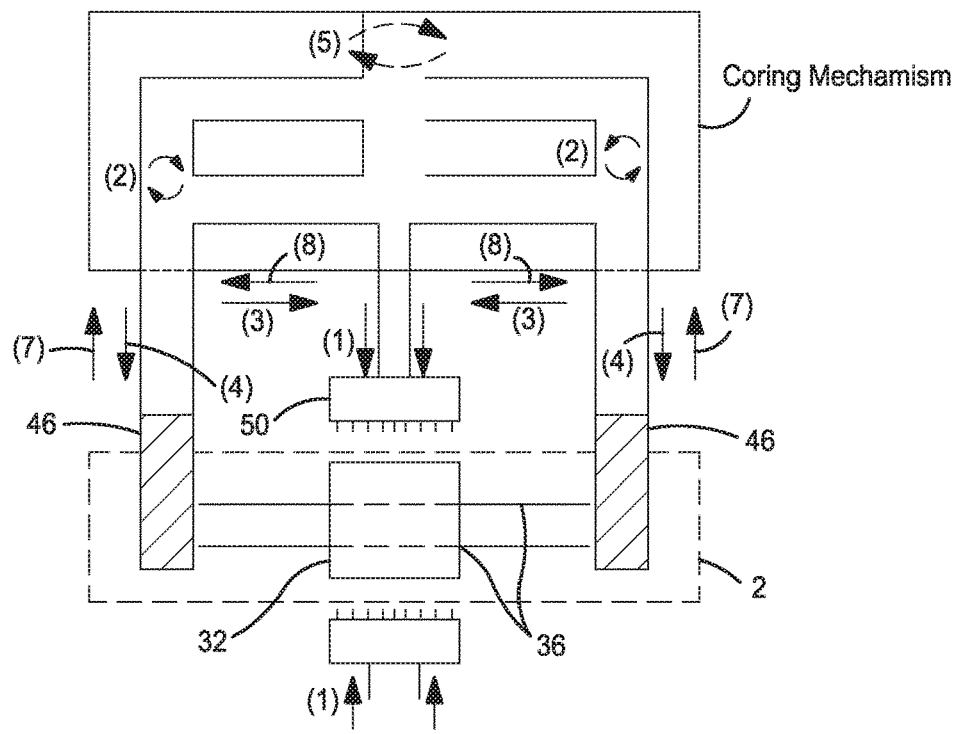

FIGS. 12a and 12b schematically represent another method of shredding the hard drives. As shown, there are four milling tools 42, 44, 46 and 48 mounted around a circle having a diameter the same as the outside diameter of the platters 36 and initially positioned above the hard drive 30. These milling tools are shaped like a drill bit in that they have a side cutting edge 48 and a front boring bit 50 so that they can bore into the hard drive and also use their sides 48 to grind away the platters 36. The milling tools 42 44, 46 and 48 are mounted on suitable mechanisms that can be moved in tracks to reciprocate each milling tools 42 44, 46 and 48 vertically into and out of the hard drive 30 and horizontally toward and away from the hub 32 of the hard drive 30.

In operation, a hardware drive platter clamp 50 moves downward as indicated by the arrows (1) and clamps the hub of the hard drive 32 and the each milling tools 42 44, 46 and 48 is rotated about its axis indicated by arrows (2). The milling tools 42, 44, 46 and 48 are spun about their individual axes and lowered into the hard drive in the direction of arrows (4) until the lower ends of the milling tools 42 44, 46 and 48 pass the platters 36 in the hard drive 2. The milling tools 42 44, 46 and 48 are then rotated around the axis of the hub 32 as indicated by the arrow 5 and at the same time, each milling tool 42 44, 46 and 48 moves radially inward toward the hub 32 as indicated by the arrows 3 grinding the platters into small particles.

When the milling tools 42 44, 46 and 48 reach the hub 33, the movement is reversed and the milling tools 42 44, 46 and 48 are rotated about the axis hub back to their original position. At the same time the milling tools 42 44, 46 and 48 are moved radially outward as indicated by the arrows 8 into their outermost position. Simultaneously, the milling tools 42 44, 46 and 48 are raised as indicated by the arrows 7 into their original position.

The Trepan and other milling tools can be adapted for better milling performance and extended wear by directing cooling nozzles that emit air, $CO_2$, $LN_2$, or micro lubricants in the form of a mist on the drive or through holes in the Trepan or milling tools (not shown).

Figure 13:
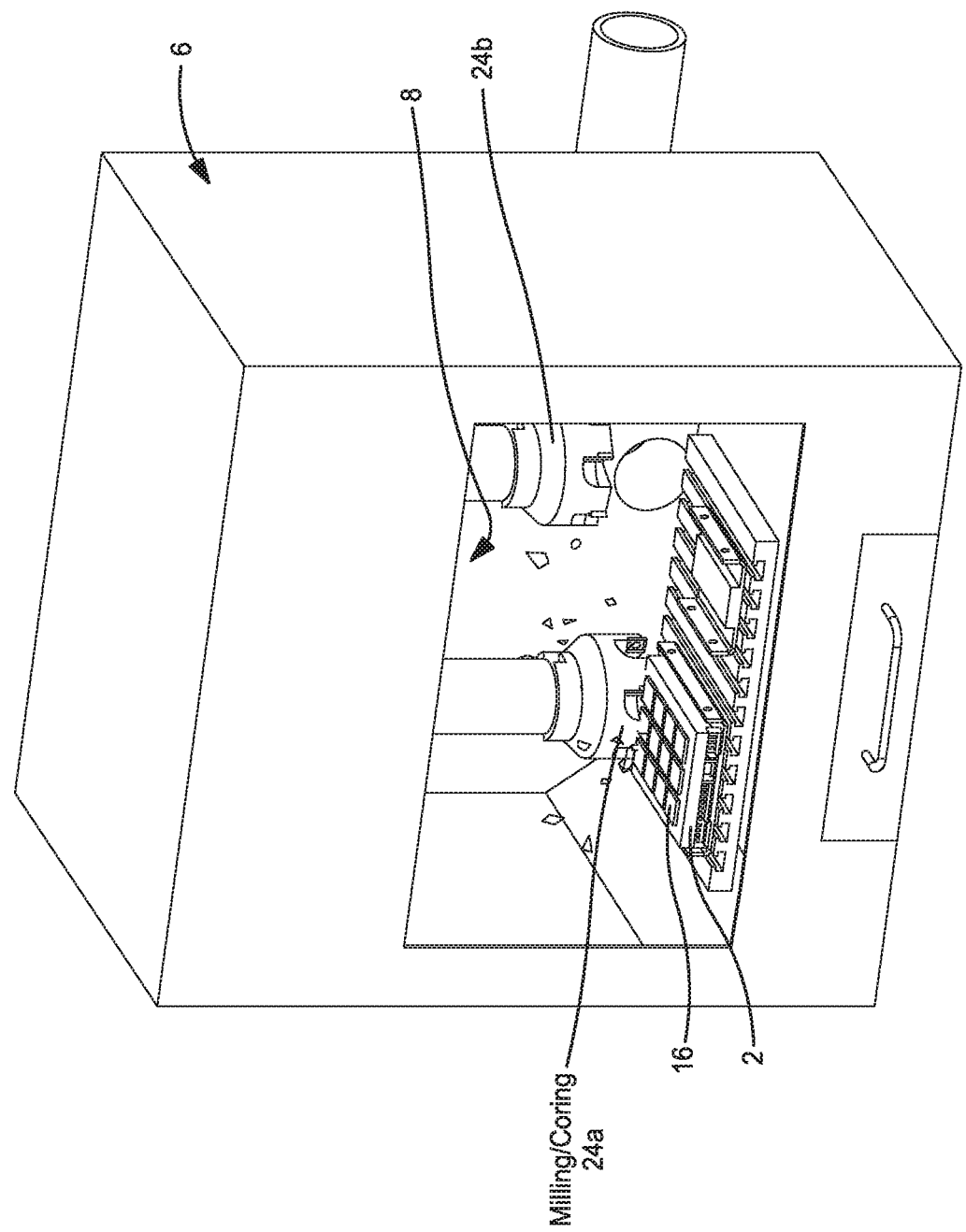
FIG. 13 is an isometric view of the drive data destroyer machine with the milling tool engaging milling cutter engaging the hard drive for surface milling the hard drive.

Step two: The x, y, and z numerical coordinates received from the destruction machine's operating system will direct the milling tool to perform a face milling procedure on the drive's circuit board 16 as shown in FIG. 13. The controlled depth of milling will allow for the NAND flash memory, information pods, to be removed without disrupting the remaining portion of the circuit board or completely mill the circuit board based on the data security guidelines.

Figure 14A:
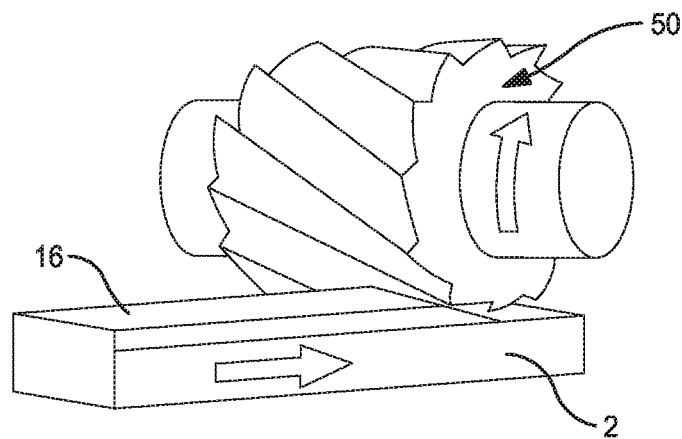
FIGS. 14a and 14b are isometric views of a horizontal plain milling tool, which can be used as an alternative method for destroying the hard drive.
Figure 14B:
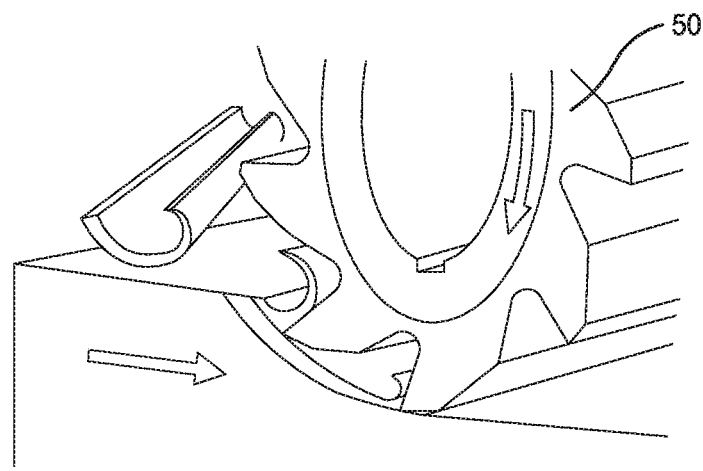
Figure 15:
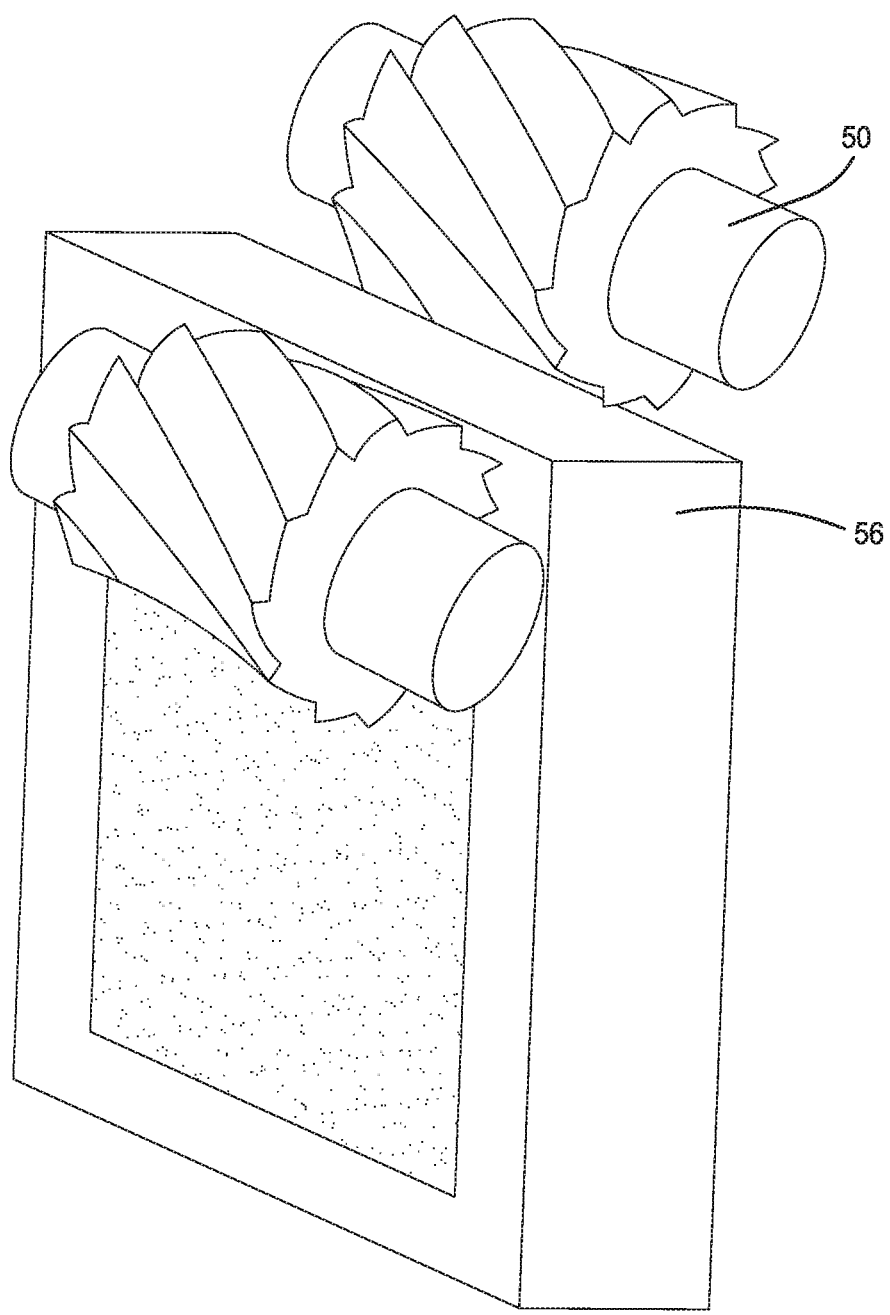
FIG. 15 is an isometric view showing the use of two horizontal plain milling tools.

As shown in FIGS. 14a and 14b, the second step of the HHD destruction process can also be performed with the integration of a Horizontal Plain milling bar 50. The milling bar 50 can be coded to pass over the surface of the circuit board 16 of the HHD drive 2 with the pre-established coordinates to only eliminate the NAND flash memory, information pods or completely destroy the circuit board, again, based on the level of information destruction required. The described milling bar 50 can also be configured to pass under the milling table to remove desired areas of the hard drive when placed in an open framed loading chassis and milling table 56 such as shown in FIG. 15. The other alternative is to have a dedicated Horizontal Plain milling bar positioned under the table to eliminate the desired surface area of the hard drive.

Rare Earth Metals Identification and Extraction

In the present system, removing the components containing the rare earth metals, which consist of the voice-coil magnet and the spindle motor, is the final process. The primary reason for this sequence is to maintain the integrity of the drives' circuit board. However, modifications can be made within the machine's operating system to have the rare earth metals extracted earlier in the destruction process.

Figure 16:
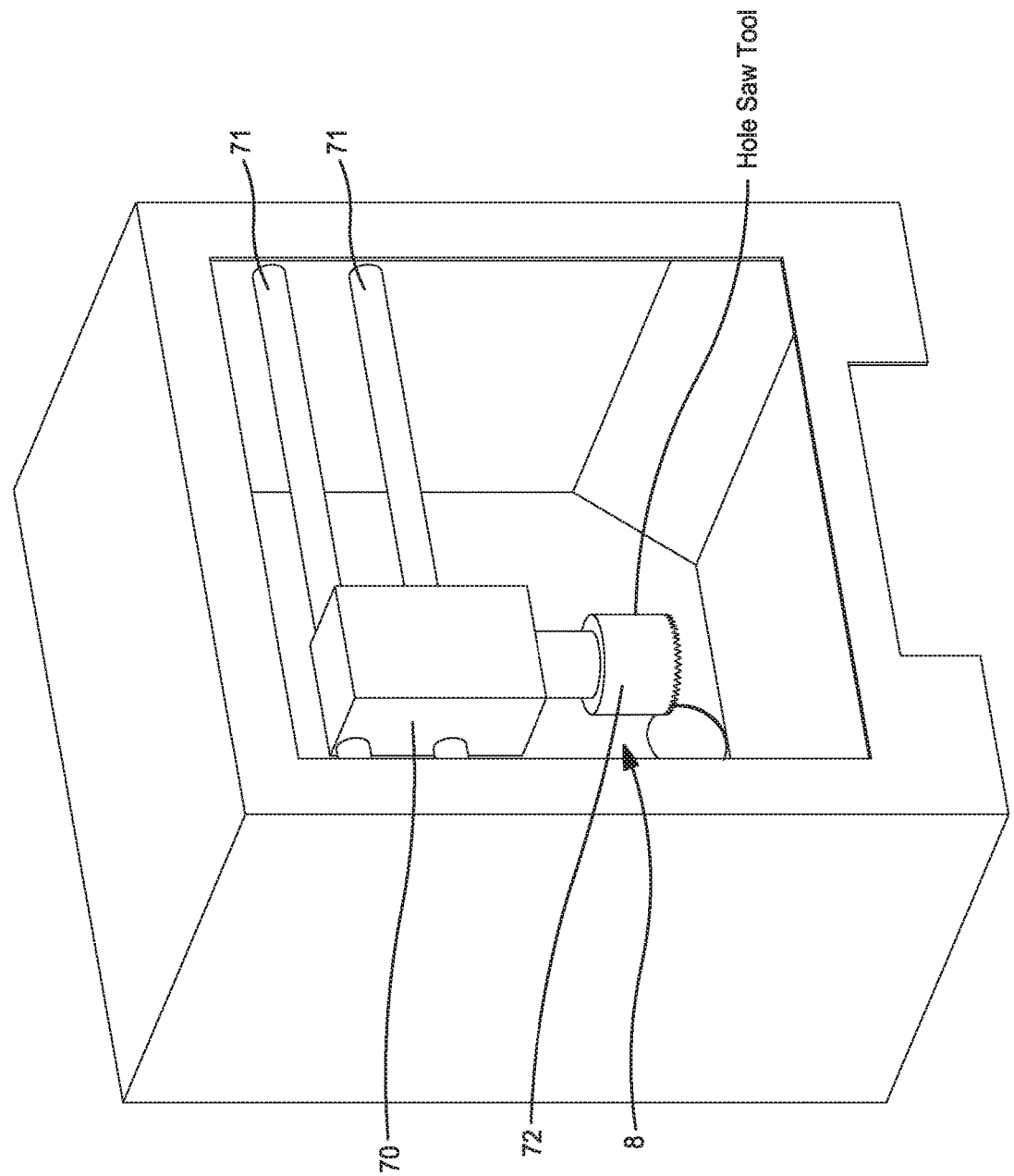
FIG. 16 is an isometric view of the hard drive data destroyer showing a rare earth metals extraction mechanism.
Figure 17A:
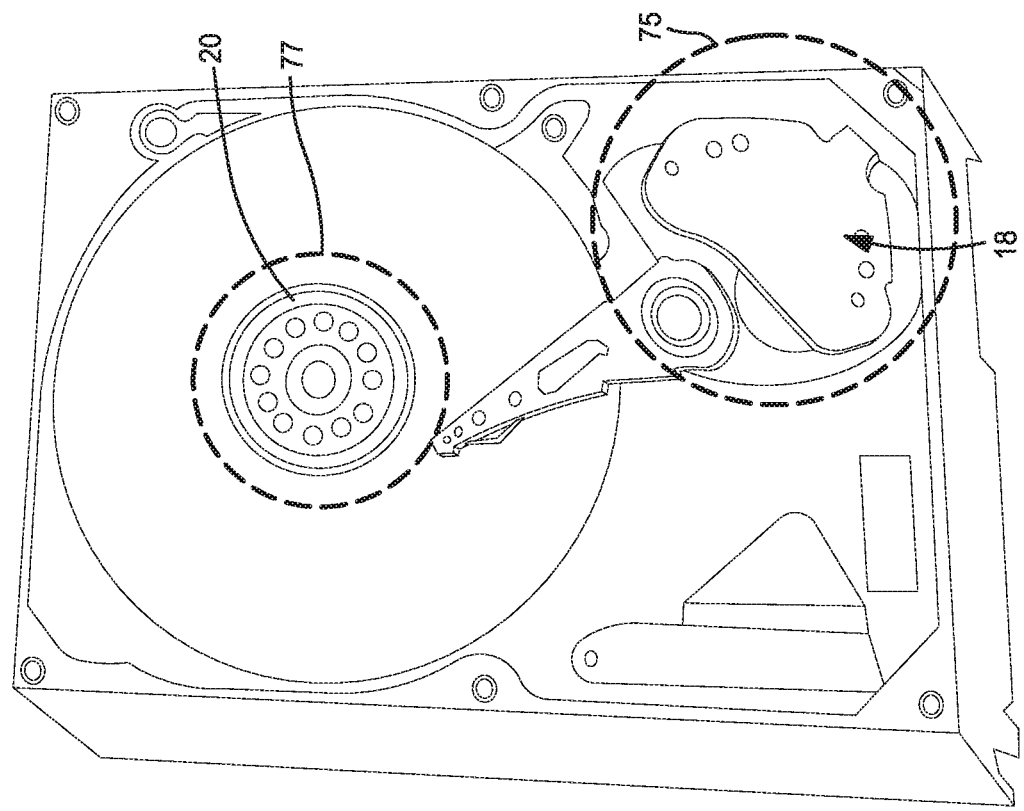
FIGS. 17a and 17b are cutaway views of hard drives showing the rare earth metals extraction areas.
Figure 17B:
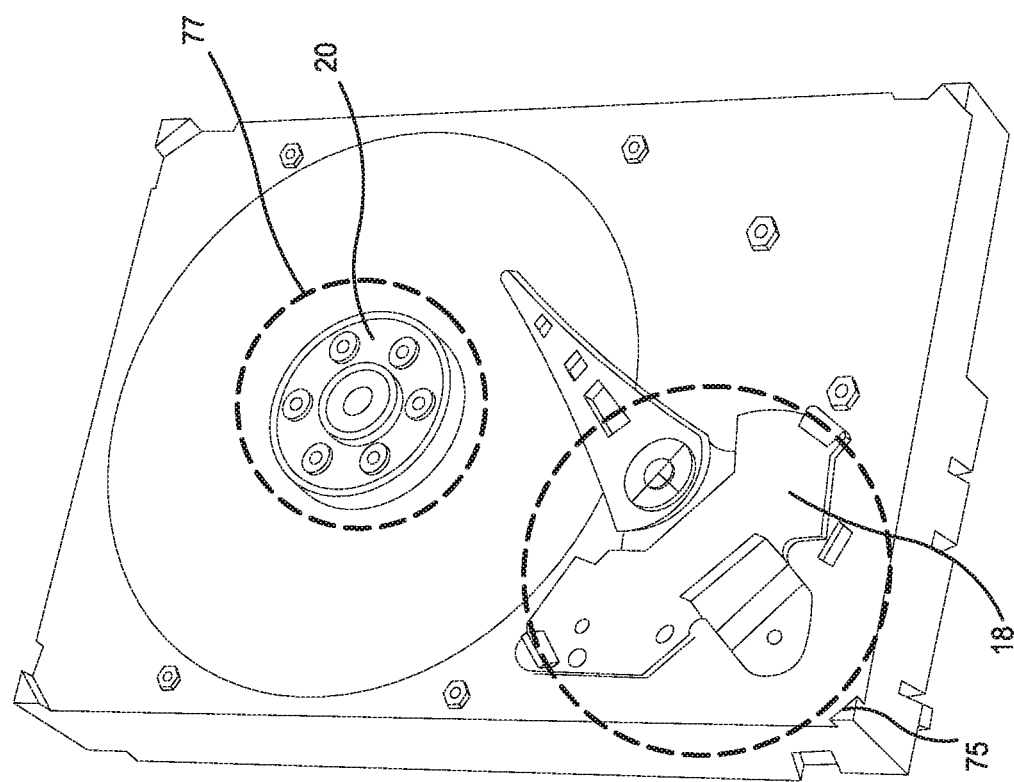

As shown in FIG. 16, a separate CNC milling mechanism 70 solely dedicated to the extraction of the rare earth metals components is positioned just inside the opening of the milling chamber 8. The milling mechanism 70 includes a single spindle milling tool 72 outfitted with a hole saw 74 to separate, punch/core-out, the components containing rare earth metals from the body of 3.5 inch or 2.5 inch HDDs and HHDs. See FIGS. 17a and 17b which show the target area of the hard drives. The target area for removal of the voice coil magnet 18 is indicated by the dashed circle 75. The target area for the removal of the spindle hub 20 is indicated by the dashed circle 77. The milling mechanism 70 is outfitted with a tool changer (not shown) to allow for the automatic exchange between a hole saw 74 used to extract the magnets containing the rare earth metals from 3.5 inch hard drives and a hole saw 74 used for extractions on 2.5 inch hard drives.

When the respective hard drives' rare earth metal coordinates are queried by the operating system, the milling mechanism can be properly activated to separate the rare earth metals components from the hard drive. Although, a single-milling system is described, the present system could be constructed to have dedicated 3.5 inch and 2.5 inch milling unit.

Figure 18:
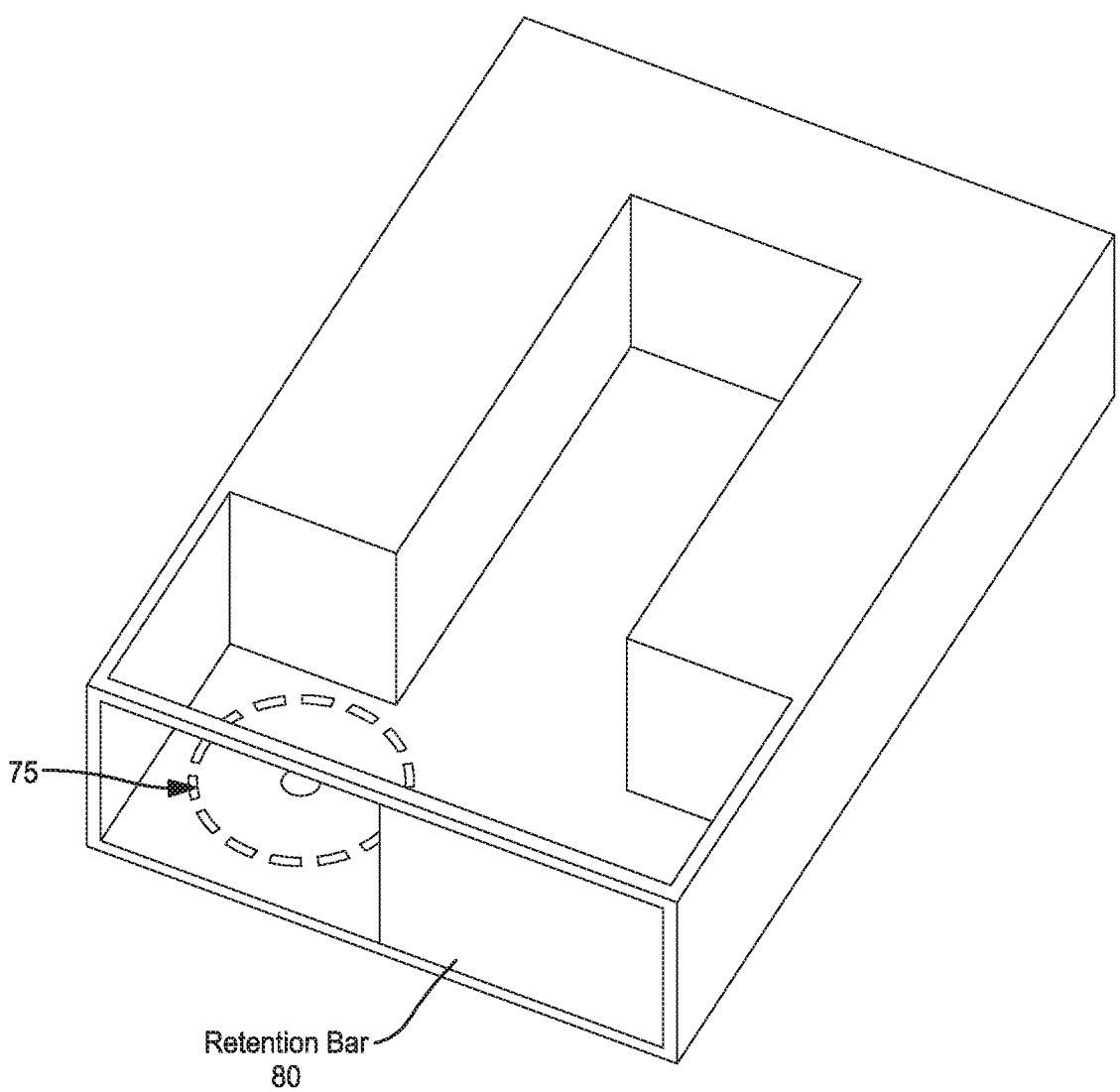
FIGS. 18-20 are isometric views of a rare earth metal hollow-based extraction tables.
Figure 19:
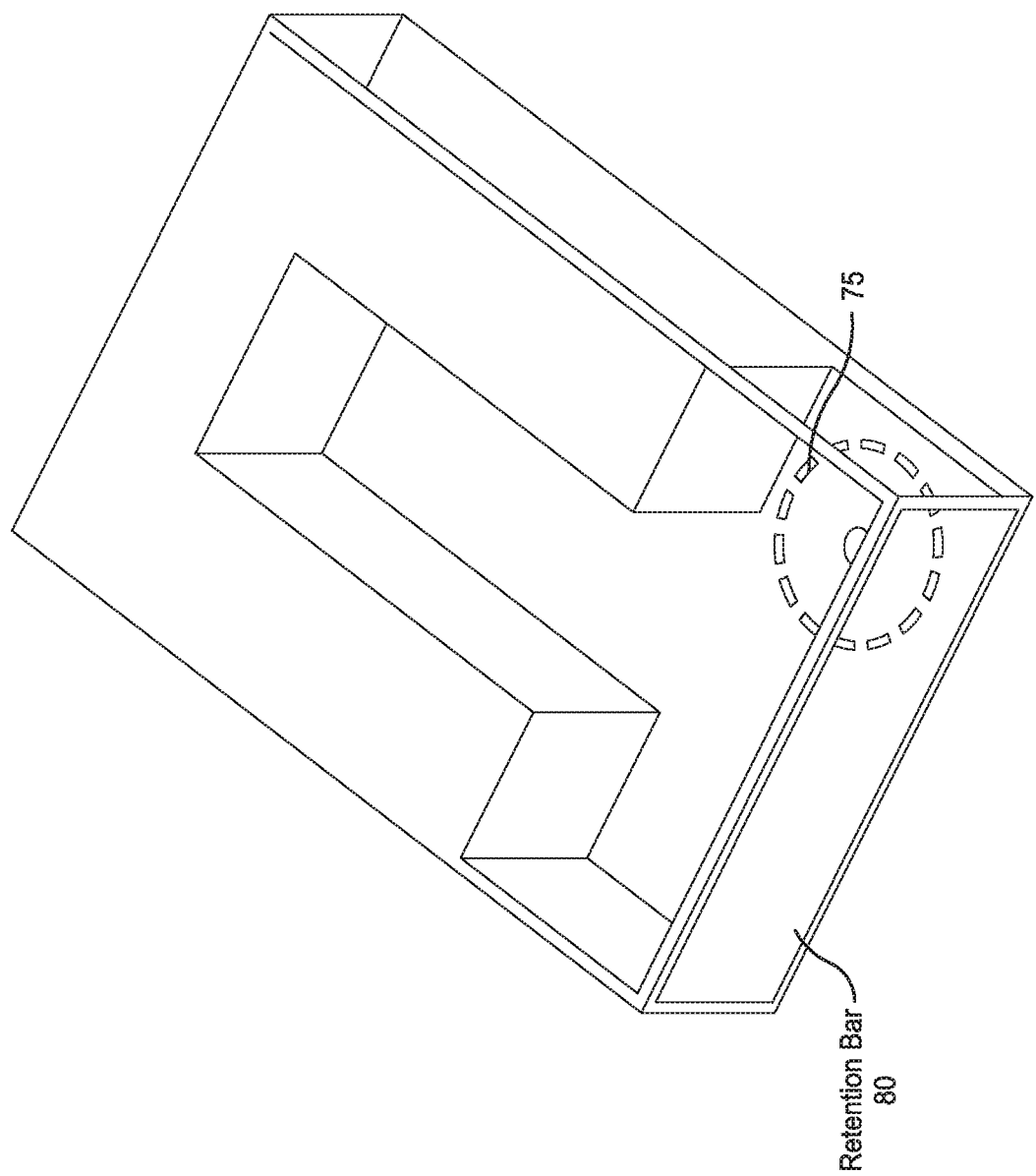

The present system will have the capacity for the milling mechanism 70 to be positioned over the lower third of the hard drive holding chassis. When coordinates are received from the rare earth metal database, the hole saw 74 is positioned over the section of the hard drive where the voice coil magnets are located, indicated by 77 in FIGS. 17*a* and 17*b*. A retention bar 80 will be automatically positioned along the bottom edge of the hard drive, where the connector pins are located, to keep the drive from shifting, horizontally, out of position during the milling process. See FIGS. 18 and 19. Depending on where the rare earth magnets are located, either in the lower left section or the lower right section of the 3.5 inch or 2.5 inch HDD or HHD, the retention bar 80 will provide stabilizing support from the opposite side.

Figure 20:
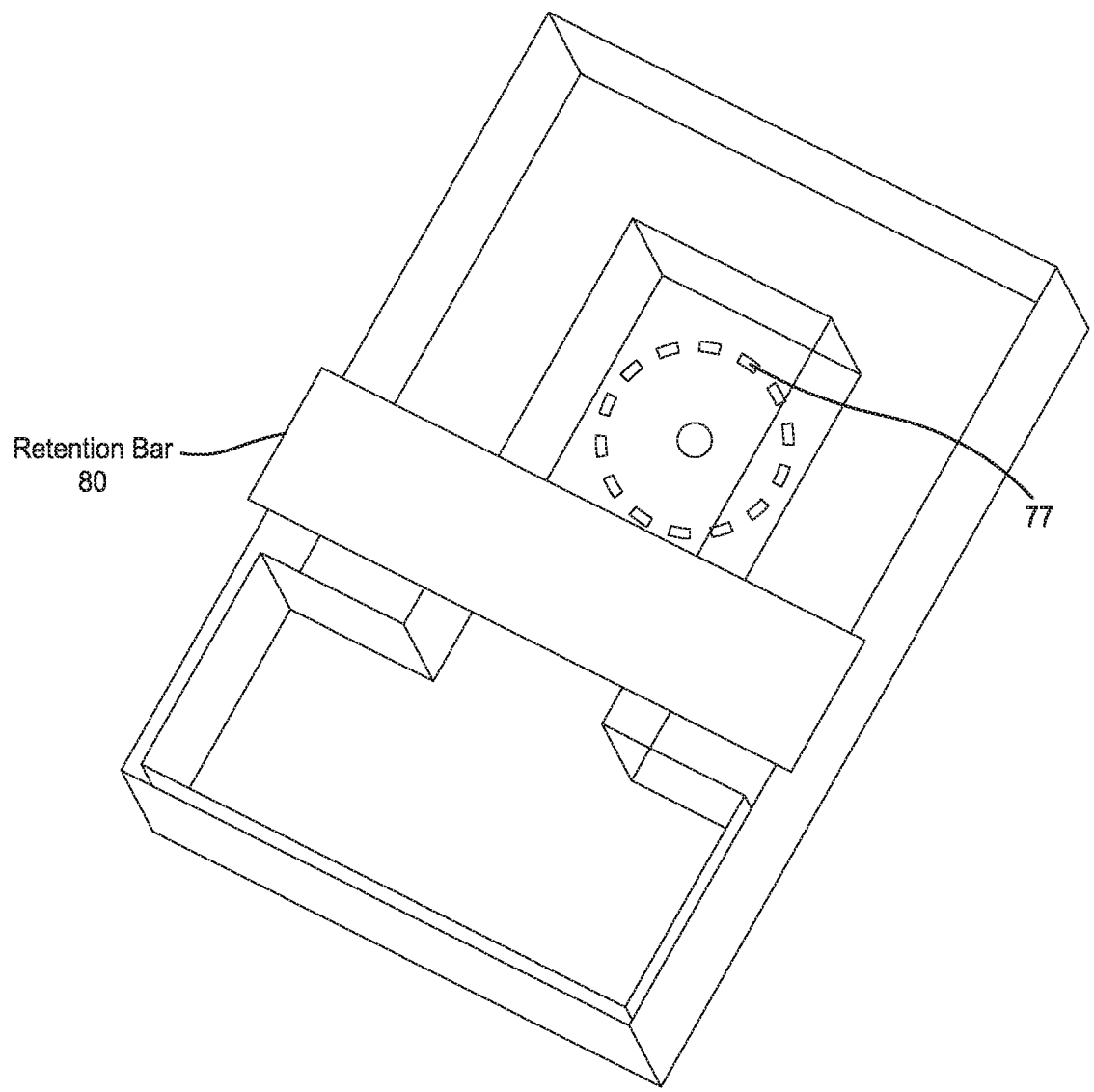
Figure 21:
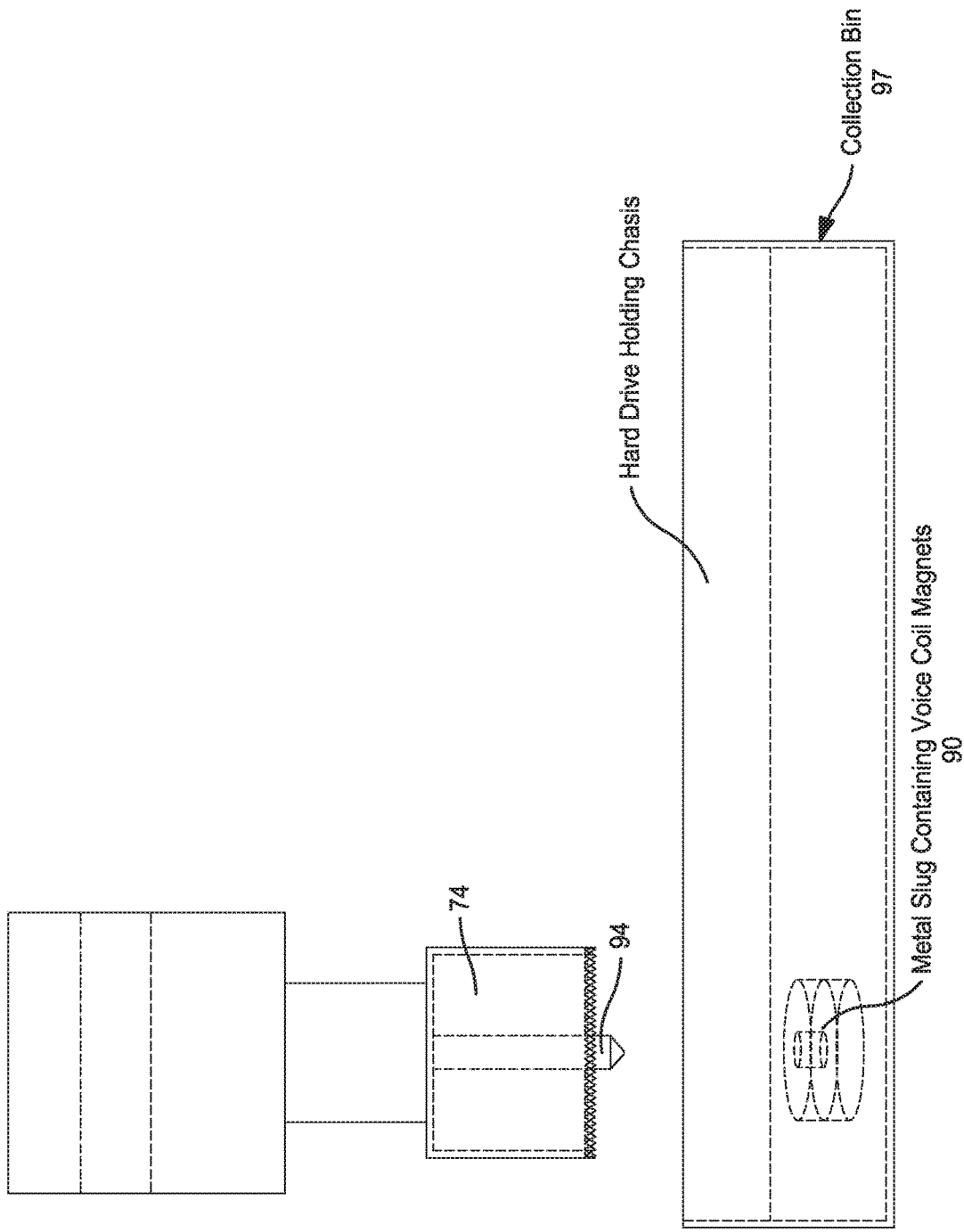
FIG. 21 is schematic view of the voice coil magnet extractor.
Figure 23:
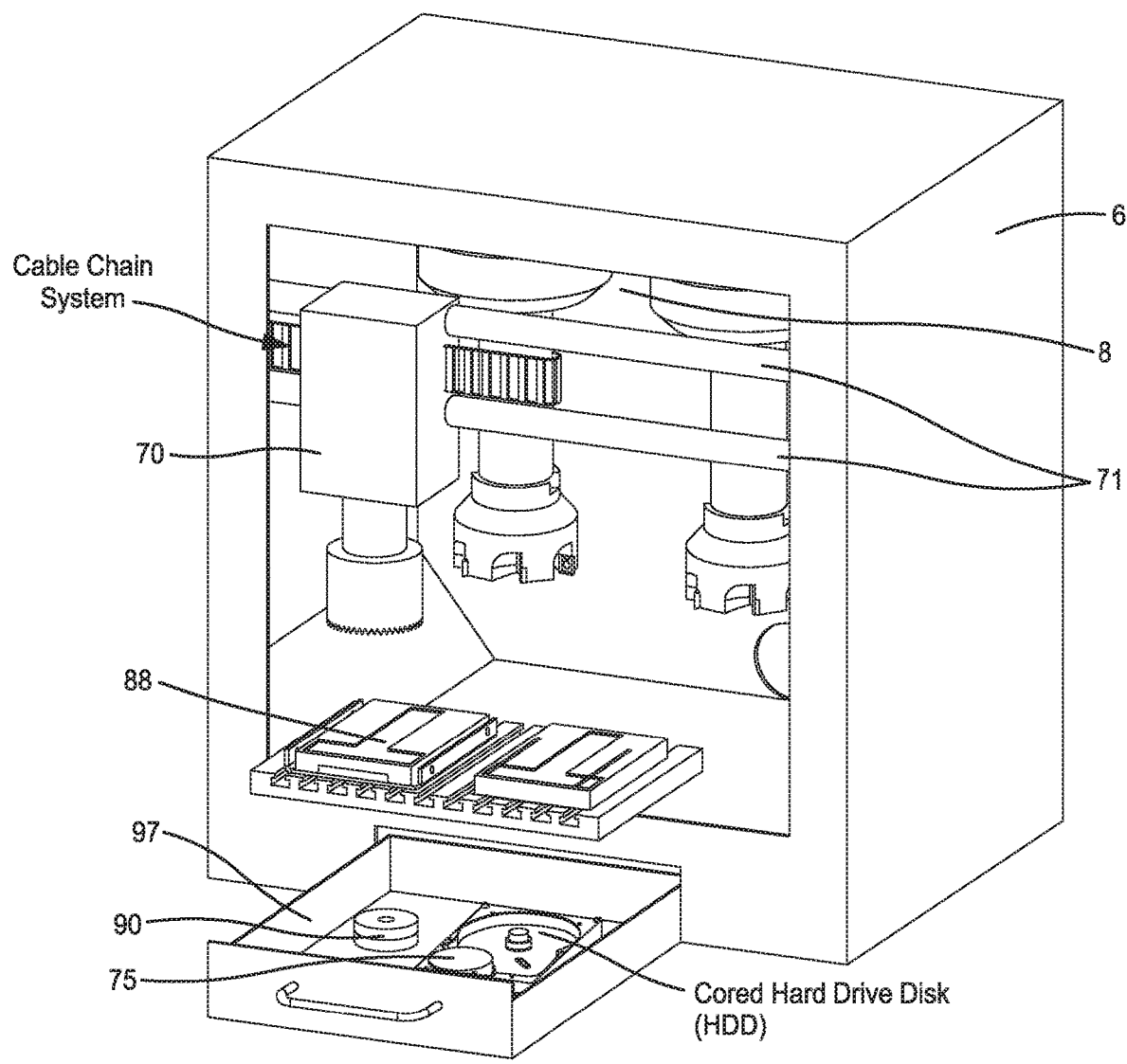
FIG. 23 is an isometric view of the hard drive data destroyer machine showing the milled NAND flash memory, information pods, from the hard drive deposited in the collection bin.

While the hole saw 74 is milling through the stainless steel and aluminum casings of the hard drive, a retention bar 86 is simultaneously placed over the upper half of the hard drive to eliminate lateral movement; and keep the hard drive securely nested in the as shown in FIG. 20. An opening 88 in the bottom third of the holding chassis will allow the milled slug 90, containing the voice coil magnet, to drop into a segregated collection bin 92 below the milling table. The bit of the hole saw 74 has a modified center punch 94 to keep the tool from shifting during the milling process; and it will help eject the metal slug, which contains the voice coil magnet. However, the center punch 94 will not penetrate or fracture the rare earth magnet. The metal slugs 90 and 96 surrounding the voice coil magnets and spindle coil will help the rare earth metals retain their integrity before being dismantled for final processing. Finally, the hard drive 2 in the holding chassis will be ejected into a collection bin 97 to cool as shown in FIG. 23.

Figure 22:
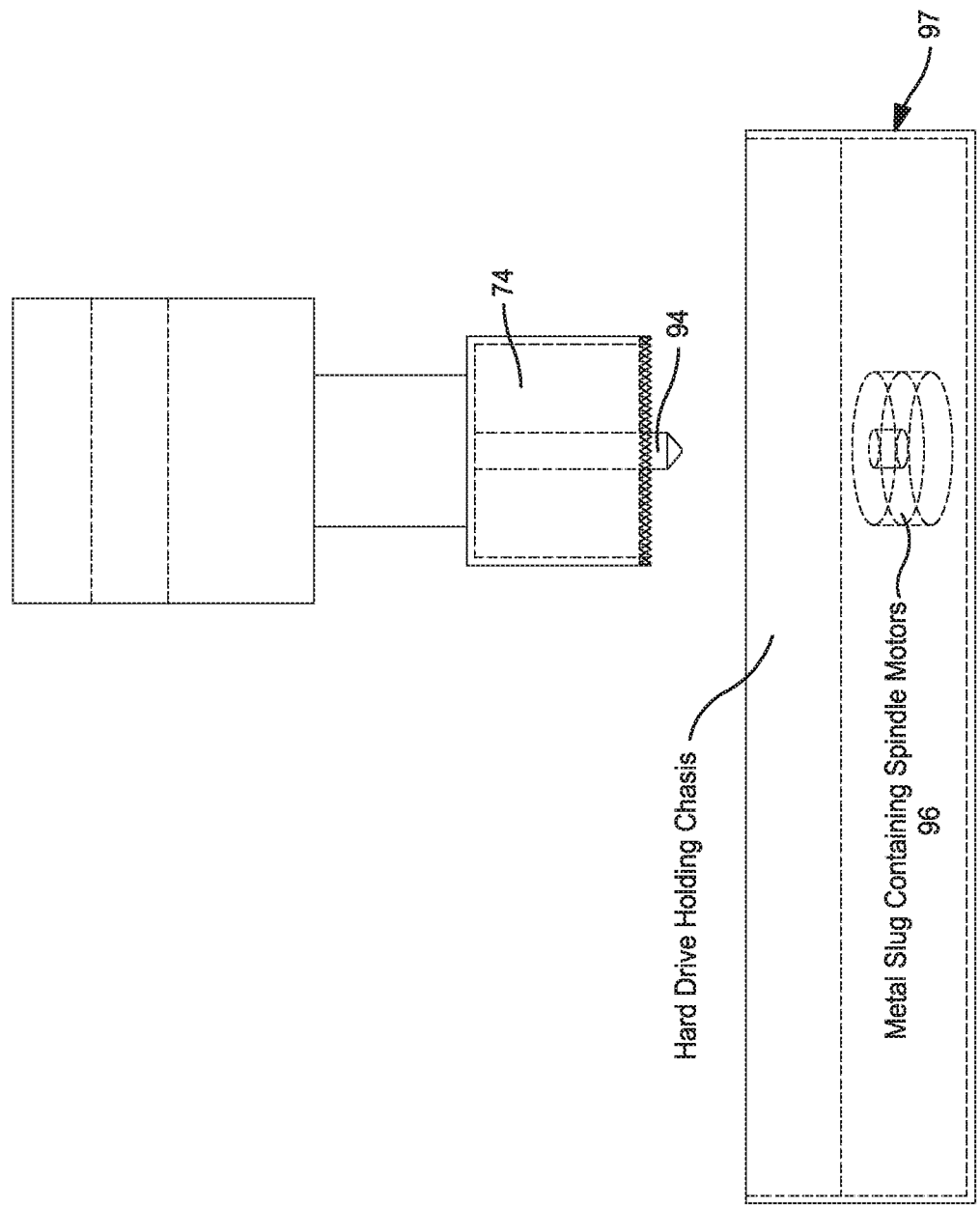
FIG. 22 is schematic view of the spindle motor extractor.

The present system will also have the capacity to core the spindle hub indicated by 77 in FIGS. 17*nd* 17*b* which, contains rare earth metals in the spindle motor, from its nested position in the aluminum chasing of 3.5 inch HDDs and HHDs. The process is executed by retrieving the x, y, and z numerical coordinates of the element, from the rare earth metals database, to position the hole saw 74 over the spindle hub section of the 3.5 inch hard drives. The same process can be executed on 2.5 inch HDDs and HHDs. However the retrieval process will not involve coring through an aluminum base to retrieve the spindle motor. An opening 88 in the base of the holding chassis and indexing table, in the shape of an inverted "T", will allow the spindle hub slug 92 to drop into the collection bin 97 below the milling chamber upon completion of the process as shown in FIG. 22.

The described system will also have a program that keeps track of the drives that are introduced to the system. When the destruction process is completed a Certificate of Destruction 100 is generated, which consists of the manufactures' barcodes from the destroyed drives and the corresponding company asset tags. The captured identification numbers will automatically populate the fields in the Certificate. The Certificate will also consist of the company receiving the service, name of person authorizing the destruction process, company personnel witnessing the destruction process, the time and date of the destruction; and the name of the technician performing the destruction process. If required, additional variables can be added to the Certificate like a running count of sub-components collected and their relative weights along with other dismantling demographics for productivity reports. However, some of the previously stated variables may not be utilized based on where the company operating the destruction machine is positioned in the products recovery continuum. The operating system will also allow for the contents of the Certificate to be included with the material retrieved from the QR and Data Matrix codes to be printed immediately or saved to a Word document or convert it to a PDF that can be stored for future use or delivered electronically to another computer, smartphone or tablet.

The destruction machine's computer interface, linked by an Ethernet cable or wireless connection, will allow the present embodiment to be performed and monitored onsite or remotely requiring minimal or no human interface. The computer interface will also allow for programmatic updates to the system's databases.

The invention claimed is:

1. A system for physically destroying the data storage portion of electronic media that include voice coil magnets and spindle magnets and retrieving rare earth metals comprising:
    a rotatable milling cutter,
    a cradle for locating the electronic media storage device in a positioned to engage the milling cutter, said cutter and/or said cradle being axially movable to permit the milling cutter to engage and remove the data storage portion of the electronic media storage device while leaving at least a portion of the remaining electronic media storage device including the voice coil magnets and spindle magnets intact;
    an integrated computer containing a database of various parameters of different types of hard drives available;
    a scanning system for determining information about the type of electronic media storage device being introduced in the system to be destroyed and conveying such information to the computer whereby the database may be used to provide information to properly locate the cradle and milling cutter to destroy the data storage portion wherein the voice coil magnets and spindle magnets remain after the destruction of the data storage portion of the electronic media storage device: and
    a slug cutter for removing a slug from the hard drive containing the voice coil magnets and a slug from the hard drive containing the spindle magnets.

2. The system of claim 1 wherein said slug cutter includes a hole saw.

3. The system of claim 2 wherein the hole saw includes a bit having a center punch to keep the hole saw from slipping while the slug is cut.

4. The system of claim 1 further including a collection bin for holding the slugs after they are removed from the hard drive.

5. A method for physically destroying the data storage portion of electronic media storage devices and recapturing rare earth metals contained in components of the electronic media, comprising:
    using a milling cutter to engage and remove the data storage portion of an electronic media storage device inserted in said device while leaving at least a portion of the remaining electronic media storage device containing the rare earth metals intact; and thereafter, using a slug cutter for removing slugs from the storage device containing the rare earth metals.

6. The method of claim 5 wherein the electronic media storage device is a hard drive including a hub with data containing platters extending from said hub, a spindle for rotating said hub and voice coil magnets containing rare earth metals contained within a housing, and said milling cutter destroys the data containing platters while leaving the spindle and voice coil magnets intact for retrieval by the slug cutter.

7. The method of claim 5 further including providing a database of information of electronic media storage devices including their configuration and location of the components containing the rare earth metals; comparing the storage device inserted in the device to the database to obtain information about the storage device to be destroyed and reclaimed; and using the obtained information to control the removal of the data storage portion of the electronic media storage device by the milling cutter while leaving at least a portion of the electronic media storage device intact.

8. The method of claim 7 further including using the obtained information to control the slug cutter for removing a slug from the hard drive containing the voice coil magnets and a slug containing the spindle magnets.

9. The method of claim 5 further including collecting said slugs after removal in a collection bin.

10. The method of claim 5 further including using a scanning system for determining information about the type of electronic media storage device being introduced in the system to be destroyed and conveying such information to a computer whereby the database may be used to provide information to properly locate the cradle and milling cutter to destroy the data storage portion and for printing out a certificate of destruction specifically identifying the hard drive that has had its data destroyed.

11. The method of claim 10 further including using the information determined by the scanning system for locating the slug cutter to remove the slugs from the hard drive containing rare earth elements.

12. The method of claim 11 wherein said scanning systems scans the bar code on the hard drive.

13. The method of claim 11 including using an optical scanner to determine the type of hard drive.

14. The method of claim 11 including using a product visioning system for recognition orientation and positioning of the milling cutter relative to the hard drive.

15. The method of claim 11 said scanning system includes a barcode, QR and data matrix codes scanner.

* * * * *